(12) United States Patent
Martin et al.

(10) Patent No.: US 12,352,923 B2
(45) Date of Patent: *Jul. 8, 2025

(54) POLYMERIC ADDITIVE MANUFACTURING OF AN OPHTHALMIC LENS

(71) Applicant: Atheneum Optical Sciences, LLC, Orange Park, FL (US)

(72) Inventors: W. Anthony Martin, Orange Park, FL (US); Ganesh Narayanan Kumar, Ponte Vedra Beach, FL (US); Randall Pugh, Jacksonville, FL (US)

(73) Assignee: Atheneum Optical Sciences, LLC, Orange Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,110

(22) Filed: Nov. 30, 2023

(65) Prior Publication Data

US 2024/0103201 A1 Mar. 28, 2024

Related U.S. Application Data

(63) Continuation of application No. 18/240,299, filed on Aug. 30, 2023, now Pat. No. 11,874,435, which is a (Continued)

(51) Int. Cl.
*G02B 1/04* (2006.01)
*B29C 64/112* (2017.01)
(Continued)

(52) U.S. Cl.
CPC ............ *G02B 1/041* (2013.01); *B29C 64/112* (2017.08); *B33Y 10/00* (2014.12); *B33Y 70/00* (2014.12);
(Continued)

(58) Field of Classification Search
CPC ..... B29C 64/10; B29C 64/106; B29C 64/112; B33Y 10/00; B33Y 70/00; B33Y 80/00
See application file for complete search history.

(56) References Cited

U.S. PATENT DOCUMENTS 3,022,708 A * 2/1962 Baker .................... G02B 17/08
359/728
5,697,043 A 12/1997 Baskaran et al.
(Continued)

FOREIGN PATENT DOCUMENTS

CN 105974604 A * 9/2016 ............. G02C 7/021
EP 2778756 A1 * 9/2014 ....... B29D 11/00038
(Continued)

OTHER PUBLICATIONS

International Search Report and Written Opinion issued in correlated International Application PCT/US22/51600 on Feb. 27, 2023.
(Continued)

*Primary Examiner* — Nahida Sultana
(74) *Attorney, Agent, or Firm* — Joseph P. Kincart; Tracnik Law

(57) ABSTRACT

Methods and apparatus for additive manufacture of an article corresponding with an energy transmissibility image. The article may include a contact lens or intraocular lens. The improvements are directed to repeated application of a monomer according to a pattern corresponding with the energy transmissibility image, such as grayscale image. The method may include intermittent pinning of deposited polymerizable mixture, partial cure, and final cure of the deposited polymerizable mixture. A pattern of multiple defined areas may be manufactured, with each area representing an amount of energy transmissibility associated with that area.

24 Claims, 17 Drawing Sheets

Related U.S. Application Data continuation of application No. 17/984,103, filed on Nov. 9, 2022, now Pat. No. 11,789,181.

(60) Provisional application No. 63/356,583, filed on Jun. 29, 2022, provisional application No. 63/306,472, filed on Feb. 3, 2022.

(51) Int. Cl.
  *B29K 23/00* (2006.01)
  *B29K 25/00* (2006.01)
  *B33Y 10/00* (2015.01)
  *B33Y 70/00* (2020.01)
  *B33Y 80/00* (2015.01)

(52) U.S. Cl.
  CPC .......... *B33Y 80/00* (2014.12); *B29K 2023/00* (2013.01); *B29K 2025/06* (2013.01)

(56) References Cited

U.S. PATENT DOCUMENTS

| | | | |
|---|---|---|---|
| 6,500,526 B1 | 12/2002 | Hannington | |
| 10,252,466 B2 | 4/2019 | Ramos et al. | |
| 11,239,422 B2 | 2/2022 | McAlpine et al. | |
| 11,789,181 B1 | 10/2023 | Anthony et al. | |
| 12,042,981 B1* | 7/2024 | Martin | B29C 64/371 |
| 2006/0274261 A1* | 12/2006 | Andino | A61B 3/0025 351/159.75 |
| 2007/0285799 A1 | 12/2007 | Dreher et al. | |
| 2009/0174863 A1* | 7/2009 | Widman | B29D 11/00134 351/159.6 |
| 2009/0304952 A1 | 12/2009 | Kritchman | |
| 2010/0047380 A1 | 2/2010 | Widman et al. | |
| 2011/0063568 A1 | 3/2011 | Meng et al. | |
| 2015/0061166 A1* | 3/2015 | Van De Vrie | B29C 64/112 264/1.7 |
| 2016/0167299 A1 | 6/2016 | Jallouli et al. | |
| 2017/0184875 A1 | 6/2017 | Newman | |
| 2018/0050550 A1 | 2/2018 | Batt | |
| 2018/0107021 A1* | 4/2018 | Bishop | B33Y 80/00 |
| 2018/0162143 A1 | 6/2018 | Biskop | |
| 2019/0009455 A1 | 1/2019 | Biskop | |
| 2019/0043268 A1* | 2/2019 | Harayama | B33Y 50/02 |
| 2019/0125662 A1 | 5/2019 | Doshi | |
| 2019/0337052 A1 | 11/2019 | Baker | |
| 2019/0375149 A1 | 12/2019 | Limem et al. | |
| 2020/0012124 A1 | 1/2020 | Waite et al. | |
| 2020/0041816 A1 | 2/2020 | Gifford et al. | |
| 2020/0079006 A1 | 3/2020 | Kindt-Larsen et al. | |
| 2021/0016496 A1 | 1/2021 | Chen et al. | |
| 2022/0274317 A1 | 9/2022 | Kindt-Larsen et al. | |
| 2023/0004023 A1 | 1/2023 | Bassampour et al. | |
| 2023/0398746 A1 | 12/2023 | Bromberg et al. | |
| 2024/0022849 A1 | 1/2024 | Valeri | |
| 2024/0424754 A1 | 12/2024 | Williams, Jr. et al. | |

FOREIGN PATENT DOCUMENTS

| | | | | |
|---|---|---|---|---|
| EP | 3722073 A1 | | 10/2020 | |
| GB | 2330451 A | * | 4/1999 | B41J 2/01 |
| JP | 2004534964 A5 | * | 11/2004 | G02C 7/02 |
| WO | WO 2015144885 | * | 10/2015 | B29C 67/00 |
| WO | WO-2016122647 A1 | * | 8/2016 | B22F 10/30 |
| WO | 2020169690 A1 | | 8/2020 | |

OTHER PUBLICATIONS

International Search Report and Written Opinion, issued in Application PCT/US2024/016738, on May 9, 2024.

Extended European Search Report and Written Opinion issued Mar. 14, 2025, in correlated Application Number 22925198.8, a European national phase of International Application No. PCT/US2022051600, 7 pages.

* cited by examiner

UN-HYDRATED LENS OPTICAL ZONE AXIAL THICKNESS PROFILE WITH LEAST SQUARES FIT

THICKNESS PROFILE FOR AN OPTIC ZONE OF AN ASTIGMATIC LENS

TRANSITION REGION ZONE OF AN ASTIGMATIC LENS

*THICKNESS PROFILE FOR THE PERIPHERY REGION ZONE OF AN ASTIGMATIC OPHTHALMIC LENS*

*THICKNESS PROFILE FOR THE FULL ASTIGMATIC OPHTHALMIC LENS*

1500

POSITION A SUBSTRATE AT A FIRST POSITION RELATIVE TO AN ADDITIVE MANUFACTURING PRINT HEAD
1501

EMIT A FIRST PATTERN OF DEPOSITED DROPLETS OF POLYMERIZABLE MIXTURE FROM THE ADDITIVE MANUFACTURING PRINT HEAD, THE FIRST PATTERN OF DEPOSITED DROPLETS OF POLYMERIZABLE MIXTURE CORRESPONDING WITH A FIRST PORTION OF AN ENERGY TRANSMISSIBILITY PATTERN
1502

RECEIVE THE DEPOSITED DROPLETS OF POLYMERIZABLE MIXTURE ON A RECEIVING SURFACE
1503

POSITION THE SUBSTRATE AT A NEXT POSITION (CURRENT POSITION PLUS N) RELATIVE TO THE PRINT HEAD
1504

EMIT A NEXT PATTERN OF DEPOSITED DROPLETS OF POLYMERIZABLE MIXTURE CORRESPONDING WITH A NEXT PORTION OF THE ENERGY TRANSMISSIBILITY PATTERN
1505

ALLOW PHYSICAL FORCES TO SMOOTH A SURFACE OF DROPLETS OF POLYMERIZABLE MIXTURE DEPOSITED DURING A CURRENT PASS
1506

INTEGRATE AT LEAST SOME OF THE DROPLETS OF POLYMERIZABLE MIXTURE DEPOSITED DURING A CURRENT PASS WITH POLYMERIZABLE MIXTURE PREVIOUSLY DEPOSITED ONTO THE RECEIVING SURFACE, TO FORM A COMBINED VOLUME OF POLYMERIZABLE MIXTURE ON THE SUBSTRATE
1507

```
EXPOSE THE DEPOSITED DROPLETS OF POLYMERIZABLE MIXTURE ON THE
RECEIVING SURFACE TO A PINNING PROCESS CAUSING PARTIAL POLYMERIZATION
OF THE DEPOSITED DROPLETS OF POLYMERIZABLE MIXTURE
1508
```

```
REPEAT DEPOSITION AND POSITIONING STEPS FOR MULTIPLE PASSES OF THE PRINT
HEAD RELATIVE TO THE SUBSTRATE
1509
```

```
CURE THE COMBINED VOLUME OF POLYMERIZABLE MIXTURE ON THE SUBSTRATE TO
PRODUCE THE FORMED OPHTHALMIC LENS
1510
```

```
RELEASING THE FORMED OPHTHALMIC LENS FROM THE SUBSTRATE
1511
```

FIG. 15A

EVALUATION OF HYDRATED HYDROGEL SAMPLES

| | PM | | Cross- | | Hydrated Lens | |
|---|---|---|---|---|---|---|
| | Equiv. $O_2$ vol-% | Atmosphere $O_2$ vol-% | section of hydrated lens | Non-hydrated surface | Appearance; % Transmittance | Center thickness μm |
| PM-1A, 1.6% x-link | | | | | | |
| 1 | <0.5% | 0.1 | | Not tacky | Clear 94.98% | 166 |
| 2 | <0.5% | 1.0 | | Slightly tacky | Clear 95.76% | 153 |
| 3 | <0.5% | 2.1 | | Tacky | Hazy 91.51% | 172 |
| 4 | <0.5% | 5.3 | | Very tacky | Hazy 80.09% | 166 |

FIG. 16A

| | PM | | Cross- | | Hydrated Lens | |
|---|---|---|---|---|---|---|
| | Equiv. $O_2$ vol-% | Atmosphere $O_2$ vol-% | section of hydrated lens | Non-hydrated surface | Appearance; % Transmittance | Center thickness μm |
| PM-1B, 1.6% x-link | | | | | | |
| 1 | 2% | 0.1 | | Not tacky | Clear 98.37% | 213 |
| 2 | 2% | 1.0 | | Tacky | Hazy n.d. | 240 |
| 3 | 2% | 2.0 | | Tacky | Hazy n.d. | 249 |
| 4 | 2% | 5.0 | x-section not possible | Liquid on top | Hazy n.d. | |

FIG. 16B

| | PM | | Cross- | | Hydrated Lens | |
|---|---|---|---|---|---|---|
| | Equiv. O₂ vol-% | Atmosphere O₂ vol-% | section of hydrated lens | Non-hydrated surface | Appearance; % Transmittance | Center thickness μm |
| PM-1C, 1.0% x-link | | | | | | |
| 1 | 5% | 0.1 | ▬▬▬ | Not tacky | Clear 93.90% | 220 |
| 2 | 5% | 1.0 | ⌒ | Tacky | slightly hazy n.d. | 207 |
| 3 | 5% | 2.0 | ⌒ | Tacky | Hazy n.d. | 245 |
| 4 | 5% | 5.0 | ⌒ | Liquid on top | Hazy n.d. | 237 |

FIG. 16C

| | PM | | Cross- | | Hydrated Lens | |
|---|---|---|---|---|---|---|
| | Equiv. O₂ vol-% | Atmosphere O₂ vol-% | section of hydrated lens | Non-hydrated surface | Appearance; % Transmittance | Center thickness μm |
| PM-2, 1.2% x-link | | | | | | |
| 1 | <0.5% | 0.1 | ⌒ | Not tacky | Clear 93.93% | 204 |
| 2 | <0.5% | 0.5 | ⌒ | Not tacky | v slight hazy 94.48% | 233 |
| 3 | <0.5% | 1.0 | ⌒ | Tacky | Hazy 92.46% | 229 |
| ACUVUE2 | — | — | — | — | 96.83% | n.d. |

"n.d." indicates that no measurement was conducted.

FIG. 16D

POLYMERIC ADDITIVE MANUFACTURING OF AN OPHTHALMIC LENS

CROSS REFERENCE TO RELATED APPLICATIONS

This application claims priority to U.S. Nonprovisional application Ser. No. 18/240,299 filed Aug. 30, 2023 as a Continuation Application; which claims priority to U.S. Nonprovisional application Ser. No. 17/984,103, filed Nov. 9, 2022, which claims the benefit of U.S. Provisional Application No. 63/306,472, filed Feb. 3, 2022, and U.S. Provisional Application No. 63/356,583, filed Jun. 29, 2022, the entire disclosures of each of which are incorporated herein by reference.

FIELD OF THE INVENTION

The present invention relates to the field of improved additive manufacturing, and in particular to methods and apparatus for forming an ophthalmic lens by repeated application of volumes of polymerizable material in a pattern representative of a mapping of energy transmissibility.

BACKGROUND OF THE INVENTION

Traditional additive manufacturing that includes the application of material being deposited based upon a computer aided design (CAD) model or other three dimensional (3D) model has been known. In such processes, a 3D model is sliced into layers, with each layer being a cross section of the 3D design. Each cross section is deposited in a sequential manner to form the article. Sacrificial layers and/or portions of layers may also be applied in the form of added material that is subsequently removed.

Materials are typically applied via a sintering process whereby a small amount of material is melted and placed in a position corresponding to a particular cross section resulting in a fusion deposition process. Such techniques include stereolithography and selective laser sintering.

Additive manufacturing can be low cost and provides more flexibility in design of a manufactured item and a manufacturing run quantity. However, items formed via additive manufacturing often lack a finished quality obtainable via other manufacturing techniques, and in particular, lack sufficient surface smoothness.

Contact lens manufacturing has evolved over the past several decades from lathe cutting to spin-cast molding to cast molding which remains as the most cost effective process. Lathing a contact lens typically includes machining of a single button of lens material at a time until a desired shape is reached. Such processes require complex lathing equipment and specialized operator expertise. In addition, they are not efficient for high volume production of contact lenses.

Cast molding is effective for high volume production of contact lenses, however each lens is formed according to an approximate size and shape and may vary up to ⅛ or ¼ diopter in a same manufacturing run resulting in a varied patient experience. The varied patient experience is sometimes referred to as a "good contact day" and a "bad contact lens day."

Cast molding of an ophthalmic lens is a complicated process involving many variables that are difficult to keep within acceptable parameters causing varied results in a final product. Variables may arise out of one or more of: depositing a curable mixture of polymerizable monomers in a mold cavity, forming the mold cavity via two mold sections, curing the monomer mixture while it is contained in the cavity, disassembling the mold assembly, and removing the lens. One mold section forms an anterior lens surface, and the other mold section forms a posterior lens surface.

The cost of cast-molding equipment is extremely high due to the size of manufacturing lines involved. In addition, fabrication of optical quality metal inserts used to cast the lens mold, and subsequent injection molding of plastic molds requires a significant up front expenditure and associated designs are limited by symmetry constraints of cast molding techniques. Cast molding also results in a large amount of plastic waste product with detrimental associated environmental impact and additional cost.

Still further, cast molding requires management of an inventory of a huge number of SKUs and associated warehouse management, order picking and shipping logistical problems, all of which add significant environmental detriments and cost to a resulting contact lens product. In addition, a family of contact lenses made by a lens molding process can only have a limited number of variations such as optical power, base curve, and diameter.

SUMMARY OF THE INVENTION

Accordingly, the present invention provides improved methods and apparatus for manufacture of an article with surface qualities conducive to use as an optical element, such as, for example, for use as a contact lens. The improvements presented herein are directed to processes involving repeated application of a monomer according to an energy intensity map, such as a grayscale image mapping the intensity of the energy spectrum associated with visible light. The improved methods include intermittent pinning and final cure of the applied monomer, result result in decreased cost of manufacture, with increased flexibility of design of a hydrogel based ophthalmic device, including an ophthalmic device that is not rotationally symmetrical. According to the present invention, a print head may be placed in a position during deposition that is not perpendicular to an apex of the receiving surface, and droplets may be non-spherical when they contact a receiving surface. Improvements also include reduction of waste material, decreased environmental impact, decreased warehousing overhead, and decreased labor required for the manufacture and storing of ophthalmic lenses.

The present invention provides that a lens may be generated via two or more components, including: an optical zone (sometimes referred to herein as an "OZ"), and a peripheral zone, or edge portion. One or both of: the optical zone, and the peripheral zone may be formed based upon an energy intensity pattern descriptive of an un-hydrated axial thickness profile.

In some embodiments, additive manufacturing equipment may be controlled to make multiple passes of a print head adding polymerizable materials to a receiving surface to form a lens (or other article) according to an axial thickness profile, including an in-air lens power (P), lens index of refraction (n), center thickness (CT), and back surface radius of curvature (RB).

Some embodiments of the present disclosure may include a method of forming an ophthalmic lens via additive manufacturing, the method including the steps of positioning a substrate at a first position relative to an additive manufacturing print head and emitting a pattern of deposited droplets of polymerizable mixture from the print head, the pattern of deposited droplets of polymerizable mixture corresponding with a portion of an energy transmissibility map of an ophthalmic lens being formed.

Some variants include receiving deposited droplets of polymerizable mixture on a receiving surface, the receiving surface including one or both of: the substrate, and previously emitted polymerizable mixture. Embodiments may include repositioning the substrate from a first position to a next position (current position plus N) relative to a print head. Repositioning may be accomplished via movement of one or both of a substrate and a printhead.

Additionally, variants of the present invention include emitting a next pattern of deposited droplets of polymerizable mixture (first position plus N) corresponding with a next portion of the energy transmissibility map of the ophthalmic lens being formed. Multiple emissions may occur during a pass of the print head relative to the receiving surface, which may include the substrate.

Some variants may include integrating material from the deposited droplets of polymerizable mixture on the receiving surface and exposing the integrated material to a pinning process causing partial polymerization of the deposited droplets of polymerizable mixture. Following a pass of the printhead, one or more of gravity, surface tension and microforces, may be allowed to act on at least some of the deposited droplets to smooth a receiving surface, such as leveling interstitial spaces between deposited droplets.

In some embodiments, at least some of the droplets of polymerizable mixture deposited during a current pass may be integrated with polymerizable mixture previously deposited onto the receiving surface to form a same volume, which may include a single volume of polymerizable mixture on the substrate. Embodiments may also include pinning deposited droplets on a receiving surface via partial polymerization of the of deposited droplets; and curing the deposited droplets of polymerizable mixture. Integration of deposited droplets alleviates the disclosed processes from the requirement of a droplet maintaining a particular shape during deposition, upon impact, or following impact.

In some embodiments, a pinning process may include the step of exposing the deposited droplets of polymerizable mixture to a first wavelength of actinic radiation for a limited amount of time sufficient to cause gelation of the deposited droplets of polymerizable mixture, yet not cause curing of the deposited droplets.

Additionally, in some embodiments, a cure process may include a step of exposing deposited droplets of polymerizable mixture to a second wavelength of actinic radiation for a sufficient time and of sufficient intensity to cause polymerization of deposited droplets of polymerizable mixture deposited in one or multiple cycles of droplet deposition.

The present invention additionally provides for a method of manufacture that includes a periphery of an object being formed, and a center portion of the object to be contained with the periphery portion. For example, in some embodiments of the present invention, an ocular contact lens with a generally spherical shape may have an edge portion including an essentially ring shape formed via additive manufacture (or other manufacturing method, such as machining and/or custom molding) and an optic zone of the contact lens formed within the perimeter portion via additive manufacturing processes. The edge portion is preferably of a greater mass than a center portion that includes an optic zone. During formation, a perimeter ring portion may be partially or fully cured, and internal stresses may be borne more so in heaver mass portions. Forming an edge portion while it is not being acted upon by a center portion allows the edge portion to form with reduced stresses during cure of deposited monomer into a polymer. While the examples provided herein are generally described with reference to a spherical contact lens, other embodiments are within the scope of the present invention, such as oblong or crescent shaped contact lenses or other articles, such as a complex shaped intraocular lens.

In some aspects, the present invention provides for application of a pattern of multiple defined areas included within a single lens, with each area representing an amount of light transmissible through each respective associated area. Each area may have a light transmissibility value based upon a scale, such as an 8 bit, 16 bit, 32 bit or 64 bit scale (other scales are also within the scope of the present invention). In some embodiments, each area may refer to a smallest single component of a digital image. Still further, in some embodiments, a smallest single component of the digital image may be referred to herein as a "pixel." In some embodiments, a pixel may be associated with a distance measurement, such as, for example, a quantity of nanometers.

The present invention provides for subsequent application of polymerizable material in multiple successive patterns, each successive pattern matching a grayscale image. Following application of each pattern of the grayscale image, the polymerizable material is pinned, but not fully polymerized.

Following a final application of the monomer in the pattern of the grayscale image, monomer aggregated from each application of the grayscale image is polymerized to form a polymer lens, such as, for example, a hydrogel contact lens formed from etafilcon.

Application of multiple successive grayscale image patterns, which may be deposited one on top of another, or positioned side by side to each other, is preferably conducted in a controlled atmosphere. The atmosphere may be controlled, by way of non-limiting example, to limit specific amounts of variables, such as one or both of: airborne particulate and gases present in the atmosphere during specific process steps involved in a manufacturing process. By way of specific example, preferred embodiments include an atmosphere with a limited an amount of oxygen to which a monomer is exposed prior to polymerization, and also limit a size and an amount of particulate that may interact with the monomer prior to polymerization.

In some embodiments, with some monomers or other polymerizable mixture, oxygen may be controlled as a critical variable involved in free-radical polymerization of monomeric materials and prepolymers involved in the manufacturing process. This may be particularly relevant for ophthalmic devices formed with hydrogels containing relatively low levels of cross-linker which are to be hydrated after polymerization, and which are susceptible to easily distort in shape from variations in a resulting polymer network.

According to another aspect of the present invention, exposure of monomer or other polymerizable mixture to a gas (such as oxygen) that may affect polymerization characterization, is carefully controlled in one or more of: an amount of exposure, a consistency of exposure throughout the monomer; and a duration of exposure. It has been discovered that, during polymerization, if oxygen concentration were to be higher on one side (Side 1) or other portion of the monomer forming an optical device as compared to a second side (Side 2) or another area, Side 1 may expand relatively more than Side 2, and a distortion of optical properties inherent in the optical device formed may occur. Similarly, any portion of a polymerizable mixture with more or less oxygen concentration may expand in an amount that differs than another portion with a different amount of oxygen concentration. By limiting availability of oxygen to the polymerizable mixture prior to polymerization, a relatively consistent oxygen concentration may be maintained within the polymerizable mixture, and a consistent swell factor caused by oxygen concentration is thereby achieved.

In some practices, relatively high concentrations of initiators, high intensity UV light energy, oxygen scavengers, waxes, or coatings may be used to manage the effects of oxygen, prior to polymerization of a polymerizable mixture. However, to date none of these has been shown to consistently fabricate high quality optical devices.

The present invention takes a novel approach in the use of 3D printing apparatus to create optical elements, such as ophthalmic devices, by controlling the presence and concentration of oxygen to low levels and/or at the same time in adjusted concentrations. In some embodiments, it is beneficial to control a level of oxygen in a polymerizable mixture with respect to a level of oxygen in an ambient atmosphere of the polymerizable mixture during manufacture of the optical device in order to obtain a desired dimensional and resultant optical properties of the optical element included in the optical device. This principle may also be extended to include the substrate on which the deposition printing occurs. Hence, embodiments include an oxygen level maintained at a predetermined level before and during the polymerization process.

In a first aspect the present invention relates to a method for three-dimensional deposition printing of an optical element, in which method a plurality of droplets of a polymerizable mixture are deposited onto a surface of a substrate under a controlled atmosphere thereby forming a pattern of energy intensity transmission through the deposited polymerizable mixture, such as a grayscale with the polymerizable mixture, wherein a controlled atmosphere containing the pattern of polymerizable mixture is maintained in a controlled environment with an oxygen concentration of at most about 5.0 volume-% (and preferably at most about 1.0 volume %), and wherein the oxygen equilibrium concentration of the polymerizable mixture is at the most about 8.0 volume-% (and preferably at most about 2.0 volume %). In this context, due to constraints of measuring a volume % of oxygen in the polymerizable mixture and ambient environment, "about" may be considered to be within 10% of the stated amounts.

BRIEF DESCRIPTION OF THE DRAWINGS

FIGS. 15 and 15A illustrate a flowchart of method steps that may be executed in some implementations of the present invention.

FIG. 16A illustrates exemplary evaluation data descriptive of hydrated hydrogel samples based upon polymerizable mixture PM-1A.

FIG. 16B illustrates exemplary evaluation data descriptive of hydrated hydrogel samples based upon polymerizable mixture PM-1B.

FIG. 16C illustrates exemplary evaluation data descriptive of hydrated hydrogel samples based upon polymerizable mixture PM-1C.

FIG. 16D illustrates exemplary evaluation data descriptive of hydrated hydrogel samples based upon polymerizable mixture PM-2.

DETAILED DESCRIPTION OF THE INVENTION

Figure 1:
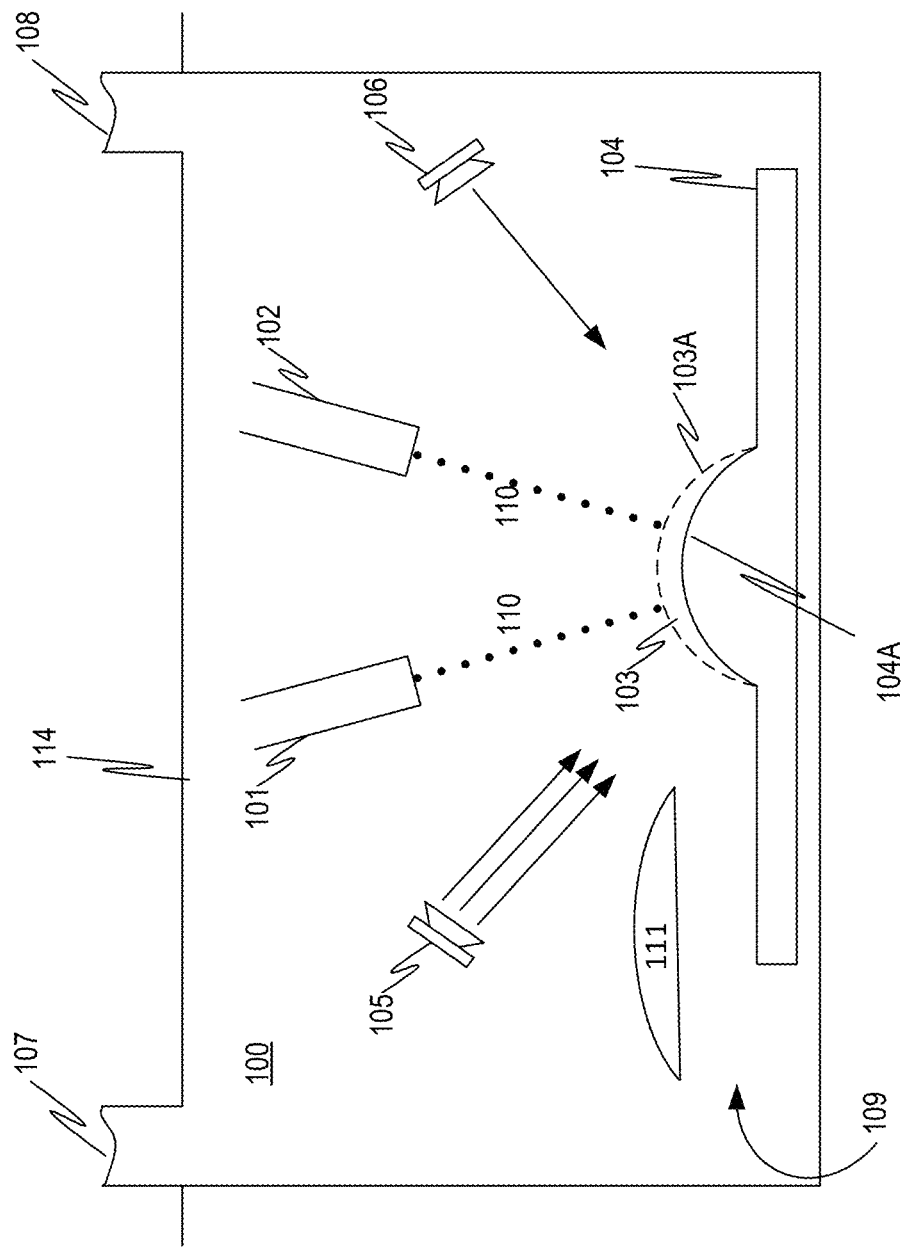
FIG. 1 illustrates an exemplary additive manufacturing apparatus that may be used in some implementations of the present invention.

The present invention provides for apparatus and methods of applying of small droplets of polymerizable mixture to a surface based upon a pattern or map of energy transmissibility. A grayscale image may be used as a map of transmissibility of visible light energy. A surface may be a planar surface; an arcuate surface; or a complex variable surface. Droplets of polymerizable mixture applied to the surface accumulate into a pattern of polymerizable mixture replicating the map of energy transmissibility. Following application of polymerizable mixture to the surface, the applied polymerizable mixture may be exposed to a limited amount of actinic conditions, such as radiation (limited in intensity and/or duration) and/or thermal energy. Exposure to the limited amount of actinic radiation is appropriate to pin the applied polymerizable mixture into position.

Polymerizable mixture that has been pinned may act as a subsequent receiving surface and receive additional polymerizable mixture applied in a pattern of energy transmissibility. After a final application of polymerizable mixture, the polymerizable mixture accumulated on the substrate surface may be exposed to sufficient actinic conditions, (e.g., radiation and thermal energy) to cure the accumulated polymerizable mixture into a polymer.

An atmosphere encompassing the droplets of polymerizable mixture during application onto the receiving surface and during pendency on the receiving surface prior to cure, may be carefully controlled in order to achieve a consistent optical quality of a device formed by the cured polymerizable mixture.

In the disclosure herein, ophthalmic lenses (and/or contact lenses) are used for illustrative and discussion purposes, however the principles are applicable for the formation of articles of manufacture in general and the teachings presented may be broadly used in any optical element (or other article) for which precise dimensional shapes; optical properties; and/or similar uniform polymer properties are preferred, such as, for example, intraocular lenses.

According to the present invention, in some embodiments, a polymerizable mixture is delivered in the form of extremely small droplets of typically 1-15 picolitre amounts at high velocities through a gaseous atmosphere with relatively high surface to volume ratios. A large number of droplets (estimated to be between 1.5 and 9 million) are required to form a 25 milligram lens. In delivering each droplet to a proper place during manufacturing, several factors may be considered. The factors may include, but are not limited to, one or more of: exposure of the droplet to ambient process conditions; a thickness of a resulting layer of material when the droplets impact a surface comprising one or both of a substrate and previously deposited polymerizable mixture; an interaction with a receiving surface comprising the substrate and/or previously deposited polymerizable mixture, such as wetting of the receiving substrate surface and merging with the previously deposited polymerizable mixture; effects of impinging droplets; pinning via an exposure time to actinic radiation and/or atmospheric gases between subsequent layers of droplets of polymerizable mixture; and curing/polymerization of deposited polymerizable mixture.

During the additive manufacturing process. there is significant opportunity for exposure of the polymerizable mixture to (and uptake of) an ambient gas, such as oxygen, from one or more of: an ambient process atmosphere (sometimes referred to as a controlled atmosphere); a receiving substrate surface; and previously deposited droplets of polymerizable mixture; if such factors are not accurately controlled, surface and bulk properties of a resulting ophthalmic lens (including optical properties) will be adversely affected.

The influence of oxygen is particularly acute in lenses produced using hydrogel materials such as 2-hydroxyethyl methacrylate (HEMA) or other monomers used in soft contact lenses and soft intraocular lenses. In these materials, variations caused by exposure to oxygen are more obvious in a final cured lens after the lens has absorbed water. In preferred embodiments therefore, exposure to oxygen may be considered to have a negative influence.

Typically, surface or skin portions of a lens formed with more oxygen present contain more polymer network defects than a bulk portion allowing more water to be absorbed in the areas formed with more oxygen present. The resulting distortion in these skin regions usually has a negative impact on the overall mechanical properties (modulus, tensile strength, elongation), optical properties (light transmission, refractive index etc.), shape, and part to part repeatability.

The present invention teaches control of, and adjusting of an oxygen content of the polymerizable mixture in relation to the oxygen content of the controlled atmosphere (as described herein) in order for the effects of oxygen to be controlled to an extent that the properties of an optical element formed are not significantly impacted.

In those embodiments that include the formation of ophthalmic devices, (e.g., contact lenses; intraocular lenses; and spectacle lenses), the ability to create an optical prescription is highly dependent on precise shapes of curved surfaces. Producing these required surfaces on these and other non-ophthalmic optical elements can be achieved by using the principles claimed in this invention, thus enabling the benefits of using 3D deposition printing such as simplicity, efficiency, more degrees of freedom in design, lower time requirements, and costs.

In some embodiments, the influence of oxygen in the polymerization process and resulting oxygen impact on properties of an item formed are eliminated or substantially reduced. This enables improved control of the movement of the polymerization mixture post deposition during the formation of a polymer matrix in layers. This may be critical in the creation of curved, arbitrary, or irregular surfaces or shapes, and more so when creating complex optical devices requiring precise curved surfaces, including a surface incorporating multiple arcuate portions. Therefore, the combined effects of overcoming oxygen inhibition and controlling the movement of the polymerization mixture in optical product applications will likely reduce and even eliminate optical artifacts and distortions.

In some embodiments, the present invention provides apparatus and methods of operating the apparatus for three-dimensional deposition manufacture of an ophthalmic device in which a plurality of droplets of polymerizable mixture are deposited onto the surface of a substrate (and/or previously deposited polymerizable mixture) under a controlled atmosphere thereby forming a layer of polymerizable mixture into a pattern replicating a map of energy transmissibility (such as a grayscale image).

In some embodiments of the present invention, an oxygen concentration in polymerizable mixture may be adjusted in relation to one or more of: an oxygen concentration of the controlled atmosphere to which the polymerizable mixture is exposed; an oxygen concentration in other parts of the environment (such as, for example a substrate receiving droplets of polymerizable mixture) so that migration of oxygen from one source to the other is avoided or at least suppressed to a degree that is insignificant to the polymerization of the polymerizable mixture.

Glossary

In this description and claims directed to the presented invention, various terms may be used for which the following definitions will apply:

"Actinic Radiation" as used herein, refers to emission of energy that is capable of initiating a chemical reaction in an associated Polymerizable Mixture. In some embodiments, actinic radiation includes radiation with a wavelength in a range of 280-450 nm. In some more specific examples embodiments, an actinic radiation corresponding to UVA and blue light includes an energy with a wavelength in the range of 315-450 nm, some preferred embodiments include energy in the 365 nm to 400 nm range.

"Addition Based Manufacture" (sometimes referred to herein as "additive manufacturing" means a process during which units of material are added to a structure being formed via the aggregation of the units of material into a shape.

"Arcuate" as used herein, refers to a geometric shape including a curved surface.

"Cure" as used herein refers to expose a polymerizable mixture to actinic conditions which may include Fixing Radiation and/or thermal energy of sufficient intensity and for a sufficient duration of time to crosslink a majority of Polymerizable mixture.

"Fixing Radiation" as used herein, refers to Actinic Radiation of appropriate wavelength, and sufficient intensity and duration to crosslink a majority of Polymerizable mixture exposed to the Fixing Radiation.

"Gelling" or "Gelation" refers to a degree of polymerization sufficient to stop or substantially slow a movement of polymerizable mixture deposited on a receiving surface while allowing subsequent droplets to meld with previously deposited polymerizable mixture and form a structure with a single mass of polymerizable mixture without distortion. Gelled polymerizable mixture moves to a higher viscosity state, but stops short of full cure. Pinning or gelation (or gelling) enhances the management of flow and form, and provides a high quality surface.

"Gel Point" as used herein shall refer to a point in a polymerization process at which a gel or insoluble fraction is formed. Gel point may be considered the extent of conversion at which the liquid polymerization mixture becomes a high viscous material that is immobile on a stationary surface. Gel point can be determined, for example, using a Soxhlet experiment: Polymer reaction is stopped at different time points and a resulting polymer is analyzed to determine a weight fraction of residual insoluble polymer. The data can be extrapolated to a point where no gel is present. This point where no gel is present is the gel point. The gel point may also be determined by analyzing a viscosity of a polymerizable mixture during a reaction. The viscosity can be measured using a parallel plate rheometer, with the polymerizable mixture between the plates. At least one plate should be transparent to radiation at the wavelength used for polymerization. The point at which the viscosity approaches infinity is the gel point. Gel point occurs at the same degree of conversion for a given polymer system and specified reaction conditions.

"Inhibitor" as used herein refers to a chemical reactant or process that slows or halts a chemical reaction.

"Initiator" as used herein refers to a substance that initiates a chain reaction or polymerization.

"Intensity" as used herein refers to an amount of power transferred per unit area, where the area is measured on a plane perpendicular to a direction of propagation of the energy (e.g., watts per square meter ($W/m^2$)).

"Lens" as used herein "lens" refers to any ophthalmic device that resides in or on the eye. These devices can provide optical correction or may be cosmetic. For example, the term lens can refer to a contact lens, intraocular lens, overlay lens, ocular insert, optical insert, or other similar device through which vision is corrected or modified, or through which eye physiology is cosmetically enhanced (e.g., iris color) without impeding vision.

"Pinning" as used herein refers to the application of actinic conditions, such as exposure to limited actinic radiation, to a polymerizable mixture in an amount sufficient to perform a gelation process or gelling, but not cause the polymerizable mixture to cure.

"Polymerizable Mixture" (sometimes referred to as "PM") as used herein, refers to a liquid mixture of components (reactive and possibly also non-reactive components) which upon exposure to an external energy (e.g., actinic radiation in a range of 280-450 nm (e.g., UV-light or blue light or heat) is capable of undergoing polymerization to form a polymer or polymer network. A polymerizable mixture may include a monomer or prepolymer material which can be cured and/or crosslinked to form an ophthalmic lens or modify an existing lens or lens blank. Various embodiments can include Polymerizable mixtures with one or more additives such as: UV blockers, bonding agents, tints, photo initiators or catalysts, and other additives one might desire in an ophthalmic lenses such as, contact or intraocular lenses. In some embodiments, a Polymerizable mixture may also be a Hydrogel Precursor.

When used herein, the expression oxygen equilibrium concentration of the polymerizable mixture of X is intended to mean the oxygen concentration in the polymerizable mixture obtained if the mixture hypothetically is allowed to equilibrate at 1.0 atmospheres (1013 millibar) with an atmosphere having an oxygen concentration of X %.

When used herein, the term optical element is intended to include but not limited to ophthalmic devices, lenses used in industrial applications, lenses for endoscopes, inspection devices, fiber optics devices, camera lenses, telescopic lenses etc. Currently particularly interesting embodiments hereof are ophthalmic devices.

In some embodiments, the optical element has one or more objects embedded therein, e.g., a solid object selected from inserts, electronics, and functional additive releasing reservoirs or depots.

In other embodiments, the optical element includes one or more functionally active substances including biologically active substances.

As used herein, an ophthalmic device is any device which is in front of the eye or resides in or on the eye or any part of the eye, including the cornea, eyelids, and ocular glands. These devices can provide optical correction, cosmetic enhancement (e.g. for iris color), vision enhancement, therapeutic benefit (for example as bandage lenses) or devices which deliver therapeutic agents such as lubricants, wetting agents, active pharmaceutical ingredients (API) and biological agents which may be anti-inflammatory, anti-allergy, anti-bacterial, anti-infective, anti-hypertensive, etc. or delivery of nutraceuticals, vitamins and antioxidants for ocular health or a combination of any of the foregoing. Illustrative examples of ophthalmic devices include those selected from a spectacle lens, a contact lens (e.g., a soft contact lens or a hard contact lens), an intraocular lens, an overlay lens, a corneal implant, such as a corneal inlay implant, and an ophthalmic/ocular insert.

In some embodiments, the ophthalmic device is a contact lens, in particular a soft contact lens, such as a contact lens of a hydrogel material, other embodiments may include an intraocular lens of hydrogel material.

The term hydrogel refers to crosslinked polymers which have absorbed water (swelled) to a water content of at least 10 weight-% thereof. Preferably such hydrogel materials have a water content of at least 20 weight-%, such as at least 25 weight-%, and up to 70 to 90 weight-%.

When used herein, the term polymerizable mixture refers to a liquid mixture of components (reactive and possibly also non-reactive components) which upon exposure to an external energy (e.g., actinic radiation 280-450 nm (like UV-light or blue light) or heat) is capable of undergoing polymerization to form a polymer or polymer network. Typically, the mixture comprises reactive components such as monomers, macromers, prepolymers, cross-linkers, and initiators. Moreover, the polymerizable mixture may further comprise other ingredients like additives such as wetting agents, release agents, dyes, light absorbing compounds such as UV absorbers and photochromic compounds, any of which may be reactive or non-reactive but are capable of being retained within the resulting ophthalmic device, as well as pharmaceutical, vitamins, antioxidants, and nutraceutical compounds. It will be appreciated that a wide range of additives may be added based upon the ophthalmic device, which is made, and its intended use.

The fact that the mixture is polymerizable typically implies that one or more constituents of the mixture (such as, for example, monomer, macromers, prepolymers, cross-linkers, etc.) comprise at least one polymerizable functional group, such as an ethylenically unsaturated group, like it is the case for (meth)acrylate, (meth)acrylamide, vinyl, N-vinyl lactam, N-vinylamide, and styryl functional groups.

In some embodiments, the polymerizable mixture contains at least one hydrophilic component. In some embodiments, the hydrophilic components can be selected from the hydrophilic monomers, e.g., those known to be useful to prepare hydrogels.

In some embodiments, hydrophilic means that at least 5 grams of the compound(s) are soluble in 100 mL of deionized water at 25° C. under weakly acidic (pH between 5 and 7) or basic conditions (pH form 7 to 9), and in some embodiments 10 grams of the compound(s) are soluble in 100 mL of deionized water at 25° C. under weakly acidic or basic conditions.

In contrast to hydrophilic, hydrophobic means that 5 grams of hydrophobic compound does not fully dissolve in 100 mL of deionized water at 25° C. under weakly acidic or basic conditions. The solubility of the compounds can be confirmed by visual observation, with any visible precipitants or turbidity indicating that the compound is hydrophobic. Solubility may be determined after about 8 hours of mixing or stirring.

One class of suitable hydrophilic monomers includes acrylic- or vinyl-containing monomers. Such hydrophilic monomers may themselves be used as crosslinking agents, however, where hydrophilic monomers having more than one polymerizable functional group are used, their concentration should be limited as discussed above to provide a contact lens having the desired modulus.

The term vinyl-type or vinyl-containing monomers refer to monomers containing the vinyl grouping (—CH=CH2) and that are capable of polymerizing. Examples of hydrophilic vinyl-containing monomers include, but are not limited to, monomers such as N-vinyl amides, N-vinyl lactams (e.g., N-vinylpyrrolidone (NVP)), N-vinyl-N-methyl acetamide, N-vinyl-N-ethyl acetamide, and N-vinyl-N-ethyl formamide, N-vinyl formamide. Alternative vinyl-containing monomers include, but are not limited to, 1-methyl-3-methylene-2-pyrrolidone, 1-methyl-5-methylene-2-pyrrolidone, and 5-methyl-3-methylene-2-pyrrolidone.

Acrylic-type or acrylic-containing monomers are those monomers containing the acrylic group: (CH2=CRCOX) wherein R is H or CH3, and X is O or N, which are also known to polymerize readily, such as N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid, and mixtures thereof.

Other hydrophilic monomers that can be employed in the invention include, but are not limited to, polyoxyethylene polyols having one or more of the terminal hydroxyl groups replaced with a functional group containing a polymerizable double bond. Examples include polyethylene glycol, ethoxylated C1-20 alkyl glucosides, and ethoxylated bisphenol A reacted with one or more molar equivalents of an end-capping group such as isocyanatoethyl methacrylate, methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups. Other suitable hydrophilic monomers will be apparent to one skilled in the art.

In some embodiments, the hydrophilic component comprises at least one hydrophilic monomer such as DMA, HEMA, glycerol methacrylate, 2-hydroxyethyl methacrylamide, NVP, N-vinyl-N-methyl acrylamide, polyethyleneglycol monomethacrylate, and combinations thereof. In another embodiment, the hydrophilic monomers comprise at least one of DMA, HEMA, NVP and N-vinyl-N-methyl acrylamide and mixtures thereof. In another embodiment, the hydrophilic monomer comprises DMA and/or HEMA.

The hydrophilic component(s) (e.g., hydrophilic monomer(s)) may be present in a wide range of amounts, depending upon the specific balance of properties desired. In some embodiments, the amount of the hydrophilic component is up to 60 weight-%, such as from 5 to 40 weight-% based upon all reactive components.

Hydrophobic silicone-containing components (or silicone components) are those that contain at least one [—Si—O—Si] group in a monomer, macromer or prepolymer. In some embodiments, the Si and attached O are present in the silicone-containing component in an amount greater than 20 weight percent, such as greater than 30 weight percent of the total molecular weight of the silicone-containing component. Useful silicone-containing components include polymerizable functional groups such as acrylate, methacrylate, acrylamide, methacrylamide, N-vinyl lactam, N-vinylamide, and styryl functional groups.

Also, in some embodiments, cross-linking monomers may be employed, either singly or in combination, and may include ethylene glycol dimethacrylate, trimethylolpropane trimethacrylate, glycerol trimethacrylate, polyethylene glycol dimethacrylate (wherein the polyethylene glycol has a molecular weight up to, e.g., 400), and other polyacrylate and polymethacrylate esters. The cross-linking monomer may be used in the usual amounts, e.g., from 0.1 to 5, and preferably in amounts of from 0.2 to 3, parts by weight per 100 parts by weight of the polymerizable mixture.

Another monomer that may also be used is methacrylic acid, which is used to influence the amount of water that the hydrogel will absorb at equilibrium. Methacrylic acid is usually employed in amounts of from 0.2 to 8 parts by weight per 100 parts of the hydrophilic monomers like HEMA. Other monomers that can be present in the polymerization mixture include methoxyethyl methacrylate, acrylic acid, and the like.

In embodiments, the polymerizable mixture comprises hydroxyethyl methacrylate (HEMA) or hydroxyethyl acrylate (HEA) monomers, preferably hydroxyethyl methacrylate (HEMA) monomers.

In embodiments, the polymerizable mixture comprises methacrylate or acrylate monomers not being hydroxyethyl methacrylate or hydroxyethyl acrylate monomers.

In embodiments, the polymerizable mixture comprises reactive silicone monomers or oligomers.

In a further embodiment, the polymerizable mixture after polymerization provides a polymer which is non-swellable in water, e.g., a polymer that is not able to take up a water content of more than 2 weight-%.

One or more polymerization initiators may be included in the polymerizable mixture. Examples of polymerization initiators include, but are not limited to, compounds such as lauryl peroxide, benzoyl peroxide, isopropyl percarbonate, azobisisobutyronitrile, and the like, which generate free radicals at moderately elevated temperatures, and photo-initiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photo-initiators are 1-hydroxycyclohexyl phenyl ketone, 2-hydroxy-2-methyl-1-phenyl-propan-1-one,bis(2,6-dimethoxybenzoyl)-2,4-4-trimethylpentyl phosphine oxide (DMB APO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available ultra-violet and visible light initiator systems include, but are not limited to, Irgacure 819® and Irgacure 1700® (from Ciba Specialty Chemicals) and Lucirin TPO initiator (available from BASF). Commercially available UV photo-initiators include Irgacure 651, Darocur 1173 and Darocur 2959 (Ciba Specialty Chemicals). These and other photo-initiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998.

In some embodiments, a polymerization initiator is included in a polymerizable mixture in amounts capable of initiating polymerization of the polymerizable mixture, such as 0.1 to 2 weight-%. Polymerization of the polymerizable mixture can be initiated using the appropriate choice of heat or visible or ultraviolet light, or other energy, depending upon a polymerization initiator used. Alternatively, in some embodiments, initiation can be conducted without a photo-initiator using, for example, e-beam. However, when a photo-initiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and DMBAPO, and in another embodiment the method of polymerization initiation is via visible light activation.

In some embodiments, a polymerizable mixture may include one or more internal wetting agents. Internal wetting agents may include, but are not limited to, high molecular weight, hydrophilic polymers. Examples of internal wetting agents include, but are not limited to, polyamides such as poly(N-vinyl pyrrolidone) and poly(N-vinyl-N-methyl acetamide).

The internal wetting agent(s) may be present in a wide range of amounts, depending upon the specific parameter desired. In some embodiments, the amount of the wetting agent(s) is up to 50 weight-%, such as from 5 to 40 weight-%, such as from 6 to 30 weight-% based upon all reactive components.

Moreover, a polymerizable mixture may contain one or more auxiliary components selected from, but not limited to, chelating agents, polymerization inhibitors, viscosity regulating agents, surface tension regulating agents, glass transition regulating agents, compatibilizing components, ultraviolet absorbing compounds, medicinal agents like ophthalmic pharmaceutical agents, ophthalmic demulcents, excipients, antimicrobial compounds, copolymerizable and non-polymerizable dyes, release agents, reactive tints, pigments, and chelating agents, and combinations thereof. In some embodiments, the sum of such auxiliary components may be up to 20 weight-%. Preferred embodiments may include photo initiators that create reactive species when exposed to one or more of: visible light, ultraviolet light, red light, and infrared light, and may include one or more of a: visible light, ultraviolet light, red light, and infrared light absorbing moiety, A polymerizable mixture may be prepared, for example, by simple mixing of the constituents of the mixture. In some embodiments, reactive components (e.g., hydrophilic monomers, wetting agents, and/or other components) are mixed together with an inert diluent to form the polymerizable mixture. Such diluents may have the effect of controlling expansion of an ophthalmic device formed upon hydration, assisting in solubility of components, and regulating a glass transition temperature. Other embodiments may exclude the inert diluent.

Classes of suitable diluents include, without limitation, alcohols having 3 to 20 carbons, amides having 10 to 20 carbon atoms derived from primary amines, ethers, polyethers, ketones having 3 to 10 carbon atoms, and carboxylic acids having 8 to 20 carbon atoms. As the number of carbons increases, the number of polar moieties may also be increased to provide the desired level of water miscibility. In some embodiments, primary and tertiary alcohols are preferred. Preferred classes include alcohols having 4 to 20 carbons and carboxylic acids having 10 to 20 carbon atoms.

In some embodiments, the diluents are selected from 1,2-octanediol, t-amyl alcohol, 3-methyl-3-pentanol, decanoic acid, 3,7-dimethyl-3-octanol, 2-methyl-2-pentanol, 2-ethyl-1-butanol, 3,3-dimethyl-2-butanol, tripropylene methyl ether (TPME), butoxy ethyl acetate, mixtures thereof and the like.

In some embodiments, the diluents are selected from those that have some degree of solubility in water. In some embodiments at least about three percent of the diluent is miscible with water. Examples of water soluble diluents include, but are not limited to, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, ethanol, decanoic acid, octanoic acid, dodecanoic acid, 1-ethoxy-2-propanol, 1-tert-butoxy-2-propanol, EH-5 (commercially available from Ethox Chemicals), 2,3,6,7-tetrahydroxy-2,3,6,7-tetramethyl octane, 9-(1-methylethyl)-2,5,8,10,13,16-hexaoxaheptadecane, 3,5,7,9,11,13-hexamethoxy-1-tetradecanol, mixtures thereof and the like. Esters of alcohols such as boric acid esters of alcohols are other embodiments of diluents.

In some embodiments, an amount of diluent preferred is typically up to 60 weight-%, such as from 10 to 60 weight-%, such as from 20 to 50 weight-%, based upon the complete polymerizable mixture.

In another aspect, in some embodiments, a polymerizable mixture includes one or more cross-linkers in an amount of 0.5 to 5.0 weight-%, one or more non-reactive diluents (such as polyhydric alcohols, esters of polyhydric alcohols or ethers of polyhydric alcohols, e.g. glycerols and glycerol esters) in an amount of 0 to 60.0 weight-%, and one or more polymerization inhibitors in an amount of less than 100.0 ppm and preferably less than 50.0 ppm, based on the weight of the polymerizable mixture. A viscosity of the polymerizable mixture may also play an important role, and is typically 1-25 cP, such as 2-15 cP, in particular 3-10 cP, although other viscosities are within the scope of the present invention.

As mentioned above, the oxygen equilibrium concentration of the polymerizable mixture is preferably 0.05-8.0 volume-%, e.g., 0.2-6.0 volume-%, e.g., in the range of 0.5-6 volume-%. The lower limits (such as 0.05%, 0.1%, 0.2% etc.) are stated for practical reasons and it is quite possible to achieve even lower concentrations.

An oxygen content of a polymerizable mixture may be adjusted to a desired level (X) by exposing the polymerizable mixture (previously being mixed under an ambient atmosphere (1013 mbar, 21 volume-% O2)) to a reduced pressure P, where P=X*1013/21 mbar. Subsequently the reduced pressure (sometimes referred to as a "vacuum") can be released and the oxygen-adjusted polymerizable mixture can be stored under an atmosphere having an oxygen concentration corresponding to a suitable atmosphere having an oxygen concentration of X.

In some preferred embodiments, the oxygen concentration in a controlled atmosphere ambient to deposited polymerizable mixture, and a substrate in contact with the polymerizable mixture is lower than the oxygen equilibrium concentration in the polymerizable mixture.

3D-Printing Device

The deposition of a plurality of droplets is typically achieved using an additive manufacturing printhead. Such printheads are capable of simultaneous deposition of a plurality of droplets of a liquid either in a one-dimensional pattern (in the form of lines) or in a two-dimensional pattern. In some embodiments, a droplet is preferably in a smaller range for additive manufacturing, such as, for example, in a picolitre range, such as between about 3 picolitres and 20 picolitres per droplet and preferably 10 to 30 passes of a printhead in relation to a substrate.

In some embodiments, a desired speed and accuracy of a deposition of the plurality of droplets may be accomplished with an additive manufacturing printhead capable of simultaneous deposition of a two-dimensional pattern of polymerizable mixture so that a pattern (or multiple successive patterns) of droplets of the polymerizable mixture representing an integer map of energy transmissibility (e.g., a grayscale image) of the ophthalmic device can be printed.

In some preferred embodiments, such as the embodiments used to form the working examples disclosed herein, a two-dimensional pattern representing an integer map of energy transmissibility in the form of a grayscale image is achievable in a single pass of a printhead depositing droplets in an area at least the size of the ophthalmic device. Commercially available printing heads suitable for this purpose include the Samba™ printhead from Fujifilm, e.g., Samba™ G3L Printhead which has 2048 nozzles per module and is capable of deposition of liquids in the order of 2.4 picolitre for native drop size to 13.2 picolitre maximum drop size at a 1200 native dpi accuracy.

A pattern of each pass of droplets deposited by the 3D-printing device, may be determined in relation to a desired transmissibility pattern of an optical lens to be formed and a shape of the optical lens being formed that correlates with the transmissibility pattern. For example (in case of an ophthalmic device), data gathered from measuring a patient's eye may be used to generate input. Data may include, for example, optical characteristics, surface properties, size and shape dimensions and observations of an ocular disease state.

Three-dimensional (3D) printable models may be created based upon a computer aided design (CAD) package or scan of a patient's eye. Patient eye scanning may include collecting and analyzing digital data representative of the shape and appearance of a patient's eye. Based on collected data, a three-dimensional model of a target ophthalmic device may be produced. The 3D model may be processed by software to convert the model into a grayscale image (or other energy intensity mapping) and produce a file containing instructions tailored to a specific type of 3D printer to repeatedly apply polymerizable mixture according to the grayscale image or other energy transmissibility pattern.

Substrate

The present invention provides for depositing a plurality of droplets of polymerizable mixture onto a surface of a substrate. Suitable materials for the substrate include one or more of: glass, polyolefins like polypropylene, polystyrene, and other smooth materials.

In some preferred embodiments, a form of a substrate represents a shape of one side of a resulting (non-hydrated) ophthalmic device, e.g., it may include at least a portion that is arcuate or otherwise curved for a contact lens and relatively flat for an intraocular lens. The size of the substrate is preferably adjusted to fit a required dimension of a finished hydrated ophthalmic device. The substrate with a rotational axis may be formed by one or more of: lathing, grinding, and injection molding. A substrate that is not constrained to shapes with a rotational axis may be prepared via other processes, such as 3D-printing. A substrate may therefore include an optical surface shape that is not spherical, such as a substrate surface shape based upon a portion of a patient's eye exposed to air.

In some embodiments, in order to adjust wettability of a surface of a substrate that will receive polymerizable mixture, a surface of the substrate may be pre-treated with one or more of: a surfactant; exposed to UV; exposed to ozone; and exposed to plasma treatment; or a combination of these treatments. In some preferred embodiments, a receiving surface of a glass or polymer substrate may be pre-treated with Tween 80 or a silicone surfactant such as Dow Corning Additive 67, Additive 14, Additive 57, Xiameter OFX-0193 etc. In some implementations of the present invention, a surfactant could be included in the polymerizable mixture.

In some embodiments, a method of manufacture of an ophthalmic lens includes bringing an oxygen concentration in the substrate into equilibrium with an oxygen concentration in the controlled atmosphere. Similarly, in some preferred embodiments, an oxygen concentration in the substrate is the same or less than an oxygen content of a polymerizable mixture deposited on the substrate.

In order to obtain an oxygen concentration in the substrate which is in equilibrium with the oxygen concentration in the controlled atmosphere, the substrate may simply be allowed to be exposed to the controlled atmosphere (or a corresponding atmosphere) prior to the deposition of the droplets, e.g., for a period of at least 8 hours.

In some embodiments, a substrate may only be capable of a limited amount of oxygen within it, hence, it may not be necessary to take any particular precautions with respect to the oxygen concentration in the substrate.

In an alternative embodiment, the substrate is in itself an ophthalmic device (such as, for example, a regular commercial contact lens), that is modified by the methods described herein so as to form a final ophthalmic device, such as, for example an ophthalmic device modified to have one or more of different optical properties; an ophthalmic device with modified color patterns; and an ophthalmic device with different physical properties.

Controlled Atmosphere

In some embodiments, an ambient atmosphere in which the deposition printing described herein takes place may be controlled. A controlled ambient atmosphere may include, by way of non-limiting example, one or both of: defined ranges of a specified gas, defined ranges of particulate and controlled wavelengths of light or other energy wavelengths. In some preferred embodiments, a suitably low concentration of oxygen is achieved in an atmosphere encompassing the polymerizable mixture such that an oxygen content of the polymerizable mixture is appropriately controlled. In some embodiments, the receiving surface of the substrate may be contained within the controlled ambient atmosphere.

By way of specific non-limiting example, in some embodiments, a controlled atmosphere has an oxygen concentration of at the most 5.0 volume-%. In some embodiments, an oxygen concentration in a controlled atmosphere is at most 2.0 volume-%, e.g., 0.01-2.0 volume-%, such as 0.03-1.5 volume-%, e.g., in the range of 0.05-1.2 volume-%, such as 0.1-1.1 volume-%, and more preferably at the most 1.0 volume-%. The lower limits (such as 0.01%, 0.03%, 0.05% etc.) are stated for practical reasons and it is quite possible to achieve even lower concentrations.

In another aspect, in some embodiments, a controlled atmosphere under which deposition of a polymerizable mixture takes place is most conveniently at a pressure of 1.0 atm. (1013 mbar) which corresponds to an oxygen concentration of 21 volume-%. A lower oxygen concentration than the 21 volume-% found in a normal atmosphere may suitably be obtained by mixing of atmospheric air with another gas, such as, in some preferred embodiments, an inert gas such as, one or more of: nitrogen, helium, argon, or other inert gas.

In some embodiments, a controlled atmosphere may include an inert gas, such as nitrogen, mixed in specific amounts with pure oxygen. One preferred approach for controlled atmosphere uses nitrogen as the inert gas to displace atmospheric oxygen and thereby achieve an oxygen concentration of a desired level.

An oxygen concentration may be monitored by an oxygen meter and regulated at one or more of: prior to an additive manufacturing process, at a start of an additive manufacturing procedure, and during the manufacturing procedure and preferably also intermittently or continuously controlled during a process preparing one or both of: an optical element and a substrate.

Depositing Additive Droplets and Curing

The methods of the present invention include depositing successive passes of a plurality of droplets of a polymerizable mixture onto a surface of one or both of: a substrate, and previously deposited droplets, under a controlled atmosphere. The droplets of polymerizable mixture are preferably emitted from a printhead and deposited based upon a two dimensional pattern representative of an energy transmissibility pattern, such as a grayscale image (or other light map representing light intensity). Following a deposition of droplets of the polymerizable mixture, the droplets may be exposed to controlled amounts of actinic radiation to cause a gelation process that pins the droplets of polymerizable mixture in place relative to the substrate.

A polymerizable mixture is typically deposited using a 3D-printing device, such as, for example, the printing devices described herein. In embodiments, individual droplets have a volume of 0.5-50 pL, such as 1-40 pL or 1.5-30 pL, like 2.0-15 pL.

In some embodiments, each plurality of droplets of the polymerizable mixture is deposited onto a surface relative to a substrate. The surface relative to the substrate may include the droplets coming into contact with one or more of: an upper surface of the substrate; droplets previously deposited; and an article placed upon one or both of the substrate and the previously deposited droplets of polymerizable mixture. Polymerizable mixture that is deposited onto previously deposited polymerizable mixture may integrate into previously deposited polymerizable mixture such that a single mass of polymerizable mixture forms on the substrate with no discernable layers. After coming into contact with the surface, the polymerizable mixture may subsequently be exposed to limited actinic radiation or heat after the deposition of the final of the successive layers of droplets for forming the ophthalmic device. Droplets of polymerizable mixture deposited upon an article may attach to the article. The article may have a surface treated with a wetting agent.

In variations of the present invention where successive dispositions layers of deposited polymerizable mixture are exposed to actinic radiation (e.g., UV light), the polymerizable mixture may include a photo-initiator. In the variants of the present invention where the polymerizable material disposed in successive passes are exposed to heat, the polymerizable mixture may include a thermal initiator.

In some variants of the present invention, successive patterns are exposed to intermittent radiation (e.g., UV light) after each deposition of a layer of droplets. A degree of polymerization obtained by such intermittent exposure to actinic radiation is typically to that required for the purpose of pinning, or otherwise obtaining gelation of, the polymerizable mixture so as to control migration of deposited droplets from a first position to another position. In preferred embodiments, such control of migration allows for limited flow of deposited polymerizable mixture but prevents unmitigated rearranging of the deposited polymerizable mixture. For example, in some embodiments, controlled migration allows gravity to integrate deposited droplets with previously deposited polymerizable mixture, and meld into a smoothed surface of polymerizable mixture that is then pinned in place with a gelation process.

In some embodiments of the present invention, a plurality of droplets of polymerizable mixture are deposited onto a surface that includes one or both of the substrate and previously deposited polymerizable mixture, thereby forming a pattern of polymerizable mixture with energy transmissibility properties based upon an integer map representing energy transmissibility, such as a two dimensional grayscale image that is referenced to control the printhead.

Deposited polymerizable mixture is preferably exposed to pinning actinic radiation after each pass (or some passes) of the printhead depositing the polymerizable mixture, and ultimately exposed to curing actinic radiation after a deposition of a final pass of a printhead depositing droplets polymerizable mixture to form the optical element.

A pass of the print head may include one or both of: the print head moving relative to a substrate onto which polymerizable mixture is received, a substrate and previously deposited polymerizable mixture) moving relative to a printhead; and/or a printhead and a substrate moving relative to each other as the polymerizable mixture is deposited. In some preferred embodiments, at least some of a pattern of polymerizable mixture deposited via a pass subsequent to a first pass of the printhead combines with and integrates into previously deposited polymerizable mixture, thereby forming a single volume polymerizable mixture. Gravity induces a limited movement of the deposited polymerizable mixture resulting in a smoothing of the surface of the deposited polymerizable mixture movement based upon gravity may be limited by surface tension forces and micro forces. Preferably the single volume of polymerizable mixture is pinned and/or gelled by exposure to a limited amount of actinic radiation thereby limiting additional movement following the smoothing effect of gravity induced movement.

In some variants of the present invention, a series of successive passes of a printhead, such as, for example, between two to twenty (2-20) passes of polymerizable mixture are deposited before exposing the deposited polymerizable mixture to intermittent actinic radiation that is effective to pin and/or gel the deposited polymerizable mixture. Prior to exposure to the intermittent actinic radiation, the deposited polymerizable mixture may undergo limited migration as a single volume of polymerizable mixture.

In some embodiments, an amount of polymerizable mixture deposited in a pass of the printhead in any particular portion of the receiving surface may be up to 50 μm, but preferably a maximum of 25 μm.

In some variants of the present invention, a polymerizable mixture includes a plurality of photo-initiators, with two or more photoinitiators having responsiveness to different wavelengths of actinic radiation. This is particularly interesting when it is desirable to utilize UV light at one wavelength for the intermittent exposure (for pinning or gelation) and another wavelength for final curing of deposited polymerizable mixture to form the optical element. Accordingly, in some variants of the present invention, a first polymerization initiator is used (in conjunction with exposure to an appropriate first actinic radiation) to create a construct of partially polymerized polymerizable mixture, and a second polymerization initiator is used (in conjunction with exposure to an appropriate second actinic radiation) to complete a curing process.

In addition to controlling a level of oxygen in the polymerizable mixture to within a desired range of oxygen content, some embodiments of the present invention include controlling polymerization of the deposited polymerizable mixture such that as an optical element is being fabricated using the processes described in this disclosure, a degree of polymerization of deposited polymerizable mixture within a specified timeframe following deposition is limited to a degree of gelation to stop, or substantially slow, a movement of the polymerization mixture while allowing droplets from subsequent passes to meld into previously deposited polymerizable mixture and form a structure for an optical element with limited distortion.

A process for intermittent gelation may sometimes be referred to as pinning or gelling of the deposited polymerizable mixture. In some variants of the present invention, a pinning process may include applying a dose of actinic radiation in an intensity, wavelength, and length of time suitable to cause gelation, such as, for example, application of ultraviolet (UV) light to a UV curable polymerizable mixture and/or ink (UV ink). Actinic radiation wavelengths may be matched to photochemical properties of a polymerizable mixture and/or UV ink used in a manufacturing process.

As a result of the intermittent gelation, deposited polymerizable mixture and/or ink droplets move to a higher viscosity state, but stop short of full cure. Variants of the present invention that include pinning or gelation (or gelling) have enhanced ability to manage a flow and form of deposited polymerizable mixture, which in turn provides high optical qualities in an optical element formed via final cure of the deposited polymerizable mixture. For example, sufficient flow to allow gravity to smooth a surface of the gelled polymerizable mixture but not significantly change a shape of an optical element is preferred. In some variants, other forces, such as, for example, centrifugal force may be used to form a surface shape.

Processes for gelation and cure may be modified based upon a selection and/or a concentration of one or more of: photo-initiators, cross-linkers, source of actinic radiation (e.g., UV light source), intensity of actinic radiation and duration of exposure. Examples of sources of actinic radiation may include light emitting diodes (LED) or light bulbs, lasers, or the like.

In some specific embodiments, two photo-initiators absorbing at two different wavelengths are used with corresponding UV LED light sources (e.g., at 365 nm and at 400 nm). One initiator may be present in a concentration capable of starting gelation of the polymerizable mixture but insufficient to complete the polymerization. This enables individual layers to come to a same relative degree of conversion prior to final cure. A final polymerization throughout the optical element may be done as a separate step using another photo-initiator/UV LED light combination (e.g.; second photoinitiator's actinic radiation energy, or third photoinitiator's etc.) actinic radiation energy resulting in a uniform polymer network required for optical function.

As an alternative hereto, a thermal initiator that is active at or above a Tg may be used instead of, or in addition to, the second (or other) photo-initiator to complete curing of the deposited polymerizable mixture. The present invention also provides that without control of an oxygen content of deposited polymerizable mixture throughout deposition process steps, and during a final curing step, the oxygen inhibition effects would adversely impact the uniformity of the polymer network and may lead to creation of incompletely cured polymer and therefore a device with a tacky surface.

In some embodiments, a polymerizable mixture is deposited onto a curved surface, a first deposition, or multiple depositions, may be deposited as patterns of droplets of polymerizable mixture onto a curved surface, according to the methods described herein. The patterns of droplets include a volume and distribution that permits surface tension to maintain a patterns of droplets of polymerizable mixture with limited flow or other movement until partially cured with a gelation process thereby pinning the deposited polymerizable mixture in place.

Subsequent deposition of additional droplets from the print head may fill in spaces left behind by a first deposition or subsequent layers until a surface of a receiving substrate is completely covered and is establishes as a foundational to build an optical element upon. Alternatives to dot patterns include deposition of droplets to form a very thin layer (e.g., 1 micron to 8 microns) and building an optical element upon such very thin layer with the processes disclosed herein.

In some embodiments, it is useful to isolate a print head containing monomer from receiving actinic radiation, such as UV radiation in order to prevent premature gelation or polymerization of monomers in a print head which may render the print head inoperable, or operable at diminished performance levels. Isolation from actinic radiation is particularly important when using reactive monomers with low levels of inhibitors and/or using a print head in an environment with low oxygen levels.

In order to achieve concurrent printing and pinning of a material to stop or slow the movement of deposited ink or polymerizable mixture once deposited, some embodiments of the present invention include apparatus operative to isolate a source of actinic radiation (e.g., UV light source) from the print head to essentially eliminate or substantially reduce a potential of gelation/polymerization of polymerizable mixture in the printhead. Isolating the print head from a source of actinic radiation and controlling both oxygen levels and movement of polymerization mixture, enables the fabrication of precise shapes and optical devices without artifacts in the matrix that adversely affect an optical performance of a final lens that is fabricated.

In some embodiments, it is preferred that to wash gelled deposited polymerizable mixture with a solvent or water, e.g., to remove excess monomers, after multiple depositions of polymerizable mixture(s) and gelation processes have been completed, but before a final curing process is performed.

Referring now to FIG. 1, a schematic diagram illustrates an example of additive manufacturing systems 100 with the apparatus and underlying software, which when executed, the software makes the apparatus operative. As illustrated, the additive manufacturing system 100 includes one or more additive manufacturing print devices 101-102 that are operative to deposit droplets 110 of a polymerizable mixture 103 in a pattern of energy intensity and/or energy transmissibility (e.g., a grayscale pattern) onto a receiving surface 103A supported by a substrate 104. The receiving portion 104A of the substrate 104 may be smooth and arcuate in a manner making it suitable as a back curve of a contact lens. The receiving surface 103A may include one or both of the designated receiving portion 104A of the substrate 104 and previously deposited polymerizable mixture 103.

One or more actinic radiation source(s) 105 and 106 (which may contain LEDs emitting a same or different wavelengths of energy).

Some variants of the present invention include an enclosure 114 with one or more ports 107 and 108 for providing a controlled atmosphere 109 within the enclosure 114. The enclosure 114 may contain an atmosphere that is ambient to and encompassing one or more of: the substrate 104, print devices 101-102, droplets 110 polymerizable mixture (which are positioned to form an ophthalmic lens, such as a contact lens) from deposited polymerizable mixture 103 which has been built up on the substrate, and a source of actinic radiation 105-106.

In some embodiments, the substrate 104 may be positioned proximate to, such as beneath, at least one 3D-printing device 101-1-2. The relationship of beneath or underneath is derived from a direction of gravity. The print devices 101-102 are operative to dispense droplets of polymerizable mixture 110 onto a receiving surface 103A. The receiving surface 103A may include one or more of: a surface of the receiving portion 104A of the substrate 104; a surface of previously deposited polymerizable mixture 103; and a receiving portion of an insert, such as a rigid lens or an electronic device. The droplets are deposited in a pattern that reproduces an energy transmissibility pattern, such as a grayscale image. Successive depositions of the pattern are aggregated to form a volume of polymerizable mixture in a desired shape of a target optical element (e.g., see FIGS. 4,-5).

Following the application of the droplets of polymerizable mixture 110 to the receiving surface 103A to form a volume of polymerizable mixture 103, the polymerizable mixture may be exposed to a first dose of actinic radiation (which will be in a first range of wavelengths and for a first duration of time and a first intensity (such as, for example, ultraviolet or blue light). In some embodiments, the first range of dose of actinic radiation may be supplied to the deposited polymerizable mixture via a first source of actinic radiation 105. Final cure can be accomplished via exposure of the aggregated polymerizable mixture to a second does of actinic radiation (which includes a second range of wavelengths, a second duration of time and a second intensity) and may be sourced from a same source of actinic radiation 105 or different source of actinic radiation 106. Final cure will allow a formed article, such as an ophthalmic lens 111 to be removed from the substrate.

In some variants of the present invention, a final cure process step may additionally be performed in an environment with a controlled temperature, such as, for example, a temperature elevated above an ambient room temperature.

According to some embodiments, a first print head 101 of the system 100 may provide a first polymerizable mixture and a second print head 102 may provide a second polymerizable mixture which may be compositionally the same or different from the first polymerizable mixture and which may include functional additives or a non-polymerizable mixture (e.g., functional additives or solvents containing functional additives).

Ambient conditions within the system 100 may be controlled, such as, in particular with respect to an oxygen content of a controlled atmosphere 109, and, in some embodiments. temperature, ambient light, amount of particulate, size of particulate, circulation, or other ambient atmosphere movement, and almost any variable that may affect one or more of: a movement of unpinned and unpolymerized deposited polymerizable mixture, polymerization of the deposited polymerizable mixture, and a shape of a device formed by polymerization of the deposited polymerizable mixture may be controlled.

In conditions where substrate 104 is capable of transmitting actinic radiation or is transparent to actinic radiation, sources of radiation 105 and 106 may both, or either, individually or in alternate combinations, be located beneath or at an angle to substrate 104 as well as that shown in FIG. 1. In addition, a shutter or other actinic radiation shield may be located above or on a lateral side of a receiving surface. The shutter or other actinic radiation shield positioned and functional to shield the print head from actinic radiation or other actinic condition.

The nature of the ambient gaseous environment can be controlled, for example, through the use of purging nitrogen gas though the inlets 107, 108. Purging can be performed to increase or reduce oxygen partial pressure to predetermined levels.

Figure 2:
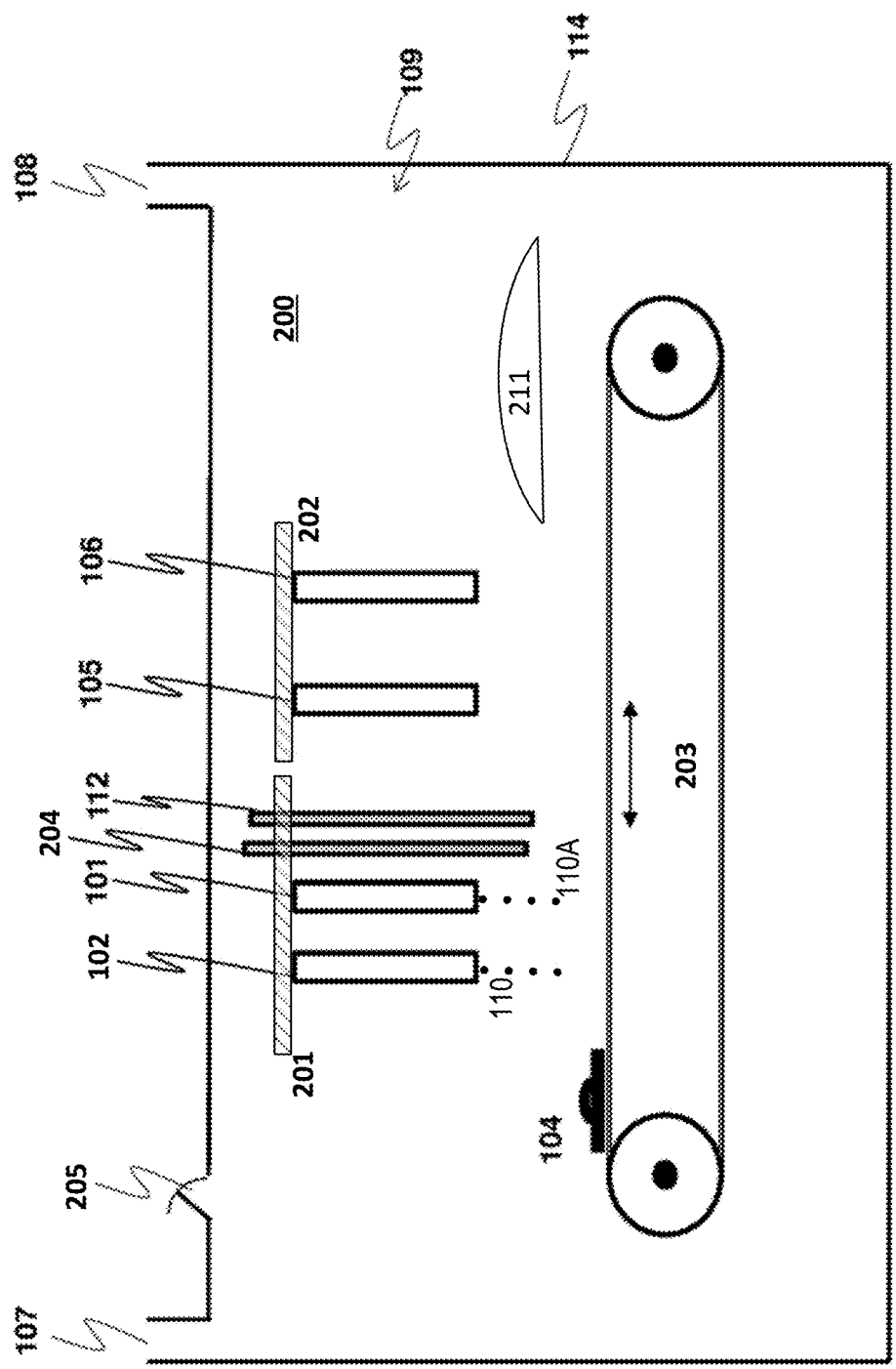
FIG. 2 is a schematic illustration of an alternative 3D printing apparatus according to some embodiments of the present invention.

Referring now to FIG. 2 a schematic diagram illustrates some alternative aspects that may be incorporated into a 3D additive manufacturing system 200. Some of same reference numbers are used as for FIG. 1 (e.g., 3D print heads 101-102, actinic radiation source(s) 105 and 106, substrate 104, an enclosure 114 with one or more ports 107 and 108, and a controlled atmosphere ambient to deposited polymerizable mixture 110). Additionally, the embodiments illustrated in FIG. 2 include an oxygen sensor 204, gate 205 for moving components in and out of the enclosure 114, a UV blocking screen 112 and an actuation structure 203 (e.g., a belt drive or stepper motor linear drive) configured to provide movement relative to the substrate 104 and the one or more 3D print head 101-102 and/or movement relative to one or more actinic radiation source 105-106.

The 3D printing system 200 illustrated is similar to that of FIG. 1, as illustrated in FIG. 2, also includes one or more actuators 201-203 configured (and operative) to provide relative movement between the substrate 104 and the one or more of: the 3D print head(s) 101-102; actinic radiation source(s) 105-106; and the actinic radiation source(s) 105-106, and in some embodiments, blocking screens 112 and/or enclosures. In some embodiments, a print head actuator 201 is configured (and operative) to move one or more of the print heads 101-102 relative to the substrate 104. Similarly, a radiation source actuator 203 is configured (and/or operative) to move one or more actinic radiation sources 105-106 relative to the substrate 104. A substrate actuator 203 is configured (and/or operative) to move the substrate 104 relative to one or both of the print heads 101-102 and the actinic radiation sources 105-106. Although a belt drive 203A is illustrated as actuation structure 203 and a stepper motor track illustrated as actuation structures 201-202, other devices and apparatus are within the scope of the present invention. The actuation structures 201-203 may be synchronized such that relative movement between one or more of: the substrate 104, print heads 101-102, and actinic radiation sources 105-106 can be coordinated with deposition of polymerizable material 110 from the print head(s) 101-102.

The processes presented herein may be practiced on the systems 100, 200 described to form an optical element 211. The process may include operation of one or more print heads 101-102 with a first print head 101 dispensing droplets 110 of a first polymerizable mixture and one or more additional print head(s) 102 dispensing droplets 110A of compositions that may include: a first polymerizable mixture, a second polymerizable mixture which is compositionally different from said first polymerizable mixture, and a non-polymerizable substance or mixture.

In some embodiments, one or more of: the first polymerizable mixture, the second polymerizable mixture, and the non-polymerizable mixture include one or more functionally active substance, such as, for example, a substance in dissolved form.

Release of the Ophthalmic Device from the Substrate and Post-Treatment

Following sufficient deposition of polymerizable mixture 103 to form an optical element 211 (e.g., ophthalmic device) and performance of a curing process, the optical element 211 is typically released from the substrate. It is preferable that the polymerizable mixture 103 deposited in a specific pattern to form the optical element 211 is sufficiently physically bound to the substrate 104 during preparation of the optical element 211 to prevent unwanted movement relative to the substrate 104, however, the polymerizable mixture 103 should not be bound so securely that removal of the optical element 211 from the substrate 104 damages the optical element 211. For example, in some embodiments, care should be taken that no covalent bonds are formed between the polymerizable mixture 103 and the substrate 104 during preparation of the optical element 211, including the curing of the polymerizable mixture 103.

The ophthalmic device 211 may be released (or otherwise removed) from the substrate 104 by physical means so as to be able to manipulate the optical element 211 in various ways. For example, the optical element may be manipulated via one or more of: washing the optical element 211 to remove by-products, soaking the optical element 211 in buffered saline, tinting, marking, and packaging the optical element 211. For example, in some variants of the present invention, such as when the optical element 211 is formed with a hydrogel polymer, the optical element 211 may be soaked with one or both of: water, and a solution, such as a buffered saline solution, sufficiently to cause the optical element 211 to expand. The expansion facilitates release of the optical element 211 from the substrate 104. A solution may also include one more release agents. Release agents may include compounds, or mixtures of compounds, which, when combined with water, decrease a time required to release an optical element 211 from the substrate 104, as compared to a time required to release such an optical element 211 using an aqueous solution that does not include the release agent(s).

Although typically preferred, it is not strictly necessary that the curing of optical element 211 is completed before release from the substrate 104.

In some embodiments, after curing, the optical element 211 is subjected to one or more extraction process steps to remove unreacted components from the optical element 211. The extraction process steps may be executed using one or more of: conventional extraction fluids, organic solvents, alcohols; water (or aqueous solutions such as buffered saline). In various embodiments, extraction can be accomplished, for example, via immersion of the lens in an aqueous solution or exposing the lens to a flow of an aqueous solution. In various embodiments, extraction can also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leach aid in the aqueous solution to a level sufficient to facilitate adequate removal of unreacted components from the lens. The foregoing may be conducted in batch or continuous processes, with or without the addition of heat, agitation, or both. The ophthalmic device may also be sterilized by known means such as, but not limited to, autoclaving and radiation sterilization. Sterilization may take place before or after packaging the optical element 211 in a suitable storage container, preferably after packaging. In some preferred embodiments, the optical element 211 is packaged in an aqueous solution.

For optical elements 211 formed with hydrogels, the packing may include packing in a physiological saline solution with around 0.9% sodium chloride and suitable buffering agents such as phosphate or borate buffer systems. In addition, the packing solution may include one or more functionally active substances including biologically active substances.

Aqueous solutions may also include additional water soluble components such as release agents, wetting agents, lubricating agents, active pharmaceutical ingredients (API), vitamins, antioxidants and nutraceutical components, combinations thereof and the like. In some embodiments, the aqueous solutions comprise less than 10 weight-%, and in others less than 5 weight-% organic solvents such as isopropyl alcohol, and in another embodiment are free from organic solvents. Depending upon a composition of the aqueous solution. The aqueous solution may or may not require special handling, such as purification, recycling, or special disposal procedures.

In some embodiments, an aqueous content of a hydrogel optical element 211 includes at least 30 weight-% water, in some embodiments at least 50 weight-% water, in some embodiments at least 70 weight-% water and in others at least 90 weight-% water.

In variants of the present invention, a polymerizable mixture 110 comprises hydroxyethyl methacrylate (HEMA) monomers, and the method comprises the subsequent step of swelling the optical element, preferably an ophthalmic device, in water, whereby the optical element obtains a water content from 10 to 80 weight-%, and preferably from 35 to 70 weight-%.

In embodiments, the polymerizable mixture 110 comprises acrylate monomers not including HEMA monomers, and the method comprises the subsequent step of swelling the optical element, preferably an ophthalmic device, in water, whereby the optical element obtains a water content from 10 to 80 weight-%, and preferably from 35 to 70 weight-%.

In embodiments, the polymerizable mixture 110 comprises reactive silicone precursors, and the method comprises the subsequent step of swelling the optical element, preferably an ophthalmic device, in water, whereby the optical element obtains a water content from 5 to 70 weight-%, and preferably from 10 to 50 weight-%.

Novel Ophthalmic Devices

The methods and apparatus of the present invention enable the formation of an optical element 211 with previously unobtainable designs, such as, by way of non-limiting example, one or more of: a contact lens or intraocular lens with a non-rotationally symmetrical surface, with corresponding optical corrections, including very steep radii of curvature and very high spherical and cylindrical corrective components; a contact lens or intraocular lens including multiple spherical and cylindrical corrections within the same lens as opposed to a single spherical corrective power reflecting the power distribution map of the eye and not just the average corrective power of refractive power from a phoropter or refractometer; and a contact lens or intraocular lens capable of (due to non-rotational symmetry) correcting optical aberrations resulting from poor surgical outcomes of PRK or LASIK or LASEK surgery or from aberrations due to an unusual corneal surface.

Repetitive Grayscale Image Based Additive Manufacture

Figure 3:
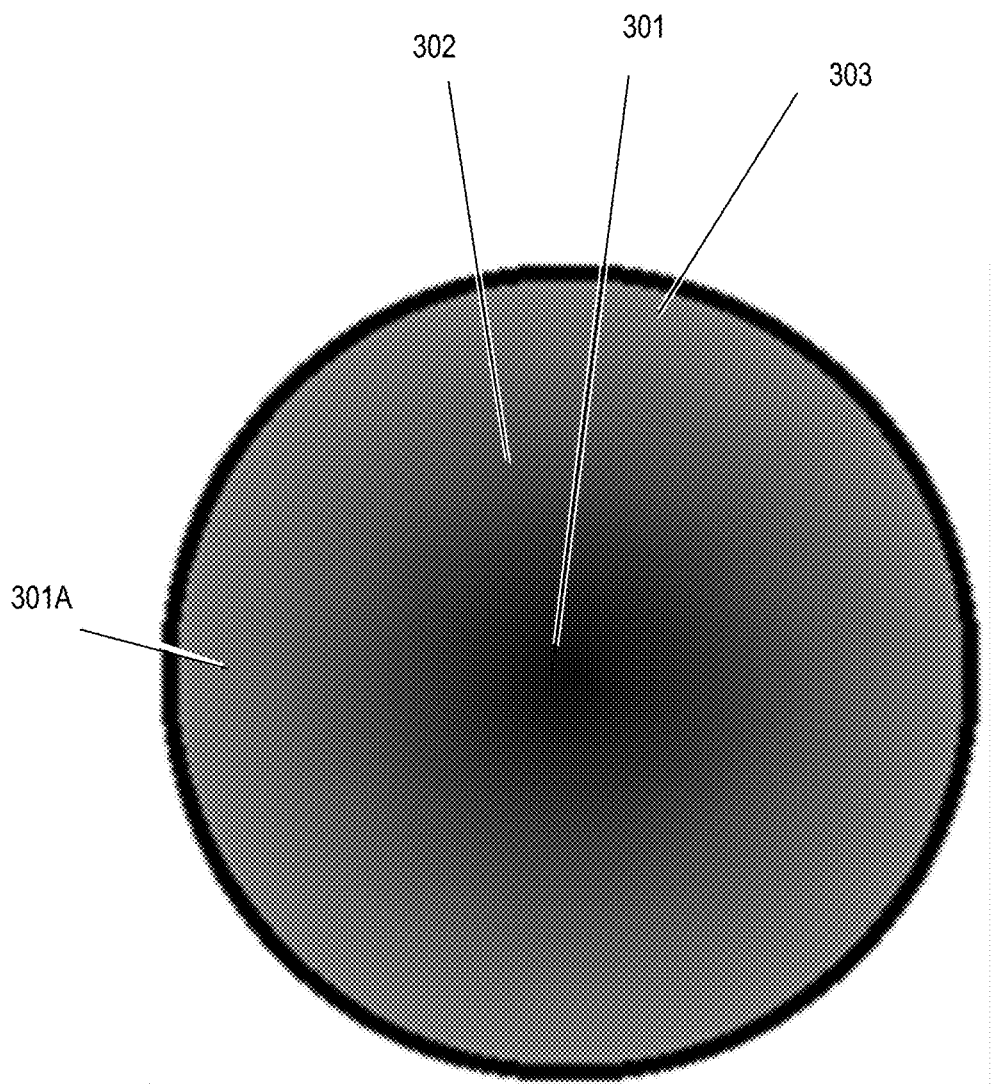
FIG. 3 illustrates an exemplary energy intensity pattern, represented as a grayscale image, which may be used to generate control protocols for 3D printing apparatus according to some embodiments of the present invention.

Referring now to FIG. 3, an exemplary energy transmissibility pattern, such as a grayscale image 300, may be used to create additive manufacturing control commands to control release of droplets of polymerizable mixture in a pattern that replicates the grayscale image 300.

For example, in some embodiments, a map of data that either directly or through conversion represents an amount of deposition of polymerizable mixture at a given location that corresponds with data values associated with pixels included in a grayscale image 300, such as, for example, an integer map. In other embodiments, a value associated with a pixel may be a float point or other expression of a whole number of a real number. The data values may correspond with an amount of energy transmissibility at a pixel location and the data values may be accessed electronically and a processor executing software commands may convert the data values to additive manufacturing printhead control commands. The printhead control commands are executable to control a deposition of a polymerizable mixture at locations that correspond to the pattern replicating the grayscale image 300 on a pixel by pixel basis. For example, a data value with a relatively larger digital number may correspond with a darker area of the grayscale image 300 and may correspond with an emission of a greater amount of polymerizable mixture from a print head than an emission corresponding with a lighter area of the grayscale image. The greater amount of polymerizable mixture than a to a thicker deposit 301 and a value of a control command may be assigned by conversion of a grayscale value at the location of a thicker deposit 301 to a control command value of the printhead for a thicker deposit 301. Likewise, a lighter value included in the grayscale may correspond to a thinner deposit 301A and a value of a suitable printhead control command may be assigned by conversion of the lighter grayscale value to an appropriate control command value for a thinner deposit 301A.

In some examples, the thicker deposit 301 may be formed by printing a relatively larger amount of polymerizable mixture on a particular location of a receiving surface during a pass of 3D printhead over the receiving surface being printed upon, and a thinner deposit 301A may correspond with printing a relatively lesser amount of polymerizable mixture at a position of a thinner deposit 301A. A thicker amount 301 may correspond with a relatively darker portion of a grayscale image 300 and a thinner amount 301A may correspond with a relatively lighter portion of the grayscale image 300.

According to the present invention, following each pass of the print head and associated polymerizable mixture deposition, the deposited polymerizable mixture may be allowed to "sit" for a short period during which the material will be acted upon by physical forces, such as gravity, surface tension and microforces to modify surface characteristics. Modifying surface characteristics, may include, by way of non-limiting example, one or more of: leveling out high and low areas formed during the deposition process; smoothing a surface of the deposited polymerizable mixture; flowing deposited polymerizable mixture into interstitial areas; and form a uniform edge of deposited polymerizable mixture.

Essentially, the present invention allows for an upper surface 302 that is formed by physical forces existing in nature, as opposed to a manufactured surface, such as a mold surface and/or a lathed surface. Gravity will smooth an upper surface of deposited polymerizable mixture prior to the deposited polymerizable mixture undergoing a gelation process, such as, for example, the deposited polymerizable mixture being pinned by exposure to a controlled amount of actinic radiation.

In some variants of the present invention, a control command may be used to determine how many passes a 3D printhead has made over a receiving surface. A number of passes of the 3D printhead may correlate with a thickness of polymerizable mixture deposited and also correlate with an amount of energy transmissibility at particular locations of a pattern of deposited polymerizable mixture. In this manner, deposited polymerizable mixture may be deposited, pinned and ultimately cured in a shape and volume suitable to form an ophthalmic lens with desired ophthalmic qualities. Deposited polymerizable mixture achieves sufficient thickness and suitable shape by repeated application of a corresponding grayscale image.

In some variants of the present invention, each pass of the 3D printhead may print a pattern of polymerizable mixture corresponding with a same grayscale image, in other embodiments, a different pass of the 3D printhead may correspond with a different grayscale image than a previous pass. As mentioned previously, in some variants of the present invention, each pass of a 3D printhead depositing polymerizable mixture may be followed by exposures of the polymerizable mixture to a gelation process, such as an amount of actinic radiation, thermal activation, or the like, that is sufficient to partially polymerize the deposited polymerizable mixture. A curing process may be completed after a final pass of polymerizable mixture is completed. In various embodiments, a final layer may be exposed to a pinning step, and/or move directly to a full curing process.

Curing and/or pinning may be facilitated by inclusion of one or more photo initiators with the deposited monomer. Photoinitiators may include, by way of non-limiting example, initiators activated by energy of or about 392 nM and 400 nM.

In some examples, an energy transmissibility pattern (e.g., a grayscale image) may be derived from an article in physical form that is processed, such as via an optical scanning process, image capture process, or photographing process, to capture the energy transmissibility data into an electronic form, such as, for example a digital data value, and the electronic form may be converted to control commands.

Some variants of the present invention include a grayscale image with a generally spherical shape, where the lighter values are associated with thicker deposits. Thus, a different conversion protocol may be assigned to different grayscale images depending on which values correspond to thick and thin deposits, respectively.

In some examples, a single grayscale image may be used to represent a desired product lens and its associated control commands. The single grayscale image is repeatedly deposited in successive passes of the 3D printhead, one pass following another until a desired optical quality is embodied in the deposited polymerizable mixture which may be cured to form an article that also meets physical parameters suitable for wearing on an eye of a patient.

In other examples, a series of grayscale images may be assembled to create multiple sets of control commands. The control commands may result in deposit of different shape designs and physically create an additive composite of the images. In other examples, multiple grayscale images may be combined and processed before any processing occurs. In some examples, a combination of multiple images may be normalized to correspond with upper and lower thickness factors.

In some examples, different features such as edge profiles 303, alignment features, and the like, may be programmed into an optical element command protocol by the addition of grayscale images to a lens profile.

In some examples, a refractive element may be designed at a location on a surface plane as an array of grayscale values, where the values correspond to an added thickness or range of thickness in the printing process. In a similar example, a constant grayscale value may equate to a plano lens element with no refractive power added to any underlying structure.

In some examples, a grayscale image may be referenced from numerous filetypes such as, by way of non-limiting example, one or more of: jpeg, tiff, bmp, png and the like, may be used to create a control command protocol to print a desired article, such as an ophthalmic lens article, by varying an amount of polymerizable mixture that is deposited at disparate locations thereby resulting in with more polymerizable mixture deposition in areas targeted for thicker deposits. The result of printing an entire pattern may result in an article with no interstitial areas.

In some variants of the present invention, a grayscale in an image or additive combination of images, may correspond to processing of multiple disparate passes of a 3D print head, wherein an amount of polymerizable mixture deposited in specific locations and subjected to a pinning process before a next deposition pass is completed. A polymerizable mixture deposited during a printing process pass may be a monomer mixture with various included photo initiators. One of the photo initiators may be associated with a wavelength of actinic radiation exposure during an associated pinning processes. After multiple printing passes have been processed, an entire volume of polymerizable mixture deposited on a receiving substrate may be subjected to a curing process. In some examples, the curing process may be exposure to actinic radiation of a different wavelength and exposure time, intensity, and the like.

In another aspect, in some embodiments, a grayscale pattern or an energy transmissibility pattern may be dithered via a dithering process or algorithm prior to generation of a control command for the printhead based upon the grayscale or energy transmissibility pattern in order to generate a smoother image deposited via expulsion of droplets from the printhead and accumulation prior to curing. Dithering may include, way of non-limiting example, processes consistent with Floyd-Steinberg, Burkes, Siena, Two Row Sierra, Jarvis, Stevenson, Arce, or other process.

Figure 4:
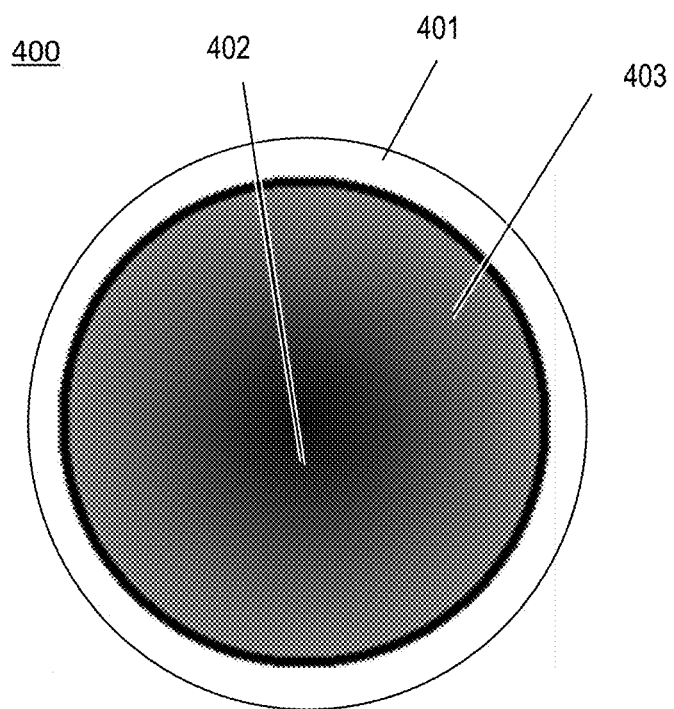
FIG. 4 is a schematic illustration of a spherical lens with an identified periphery portion according to some embodiments of the present invention.

Referring now to FIG. 4, an optical element 400 is illustrated according to some embodiments of the present invention. The optical element 400 includes a periphery portion 401 that may be printed or otherwise formed before an optical zone portion 402 of the optical element 400. A lens carrier portion 403 may transition the optical zone portion 402 and the periphery portion 401. The carrier portion 403 is preferably of a size and shape conducive to comfortably maintaining a completed lens in place on a wearer's eye. During additive manufacturing of the optical element 400, polymerizable mixture included in the periphery portion 401 may be deposited and pinned, but not fully polymerized, before the polymerizable mixture included in the optical zone portion 402 is printed and pinned. In some preferred embodiments, the periphery portion 401 may include a greater mass so that as the polymerizable mixture cures into a polymer, stresses resulting from the polymerization process will not deform the optical zone portion 402 due to stabilizing influence of the greater mass of the periphery portion 401.

In some embodiments, the periphery portion 401 may remain with the optical element 400 and form a comfortable edge feature. In other embodiments, some or all of a periphery portion 401 may be removed, such as, for example via laser trimming.

Embodiments that include a higher mass periphery zone portion 401 may be formed via the steps of: a) printing or otherwise depositing polymerizable mixture in the periphery zone portion (which, for a spherical lens may have a generally annular, and other lenses a corresponding perimeter shape such as an oval shape or almond shape); b) pinning the polymerizable mixture in the periphery zone portion 401, wherein pinning will preferably occur after each pass of a print head depositing monomer; c) printing or otherwise depositing polymerizable mixture in an optic zone; pinning the polymerizable mixture in the optic zone; and curing the deposited polymerizable mixture. Some embodiments may additionally include placing a cap in the optic zone to provide an optic quality.

Figure 5:
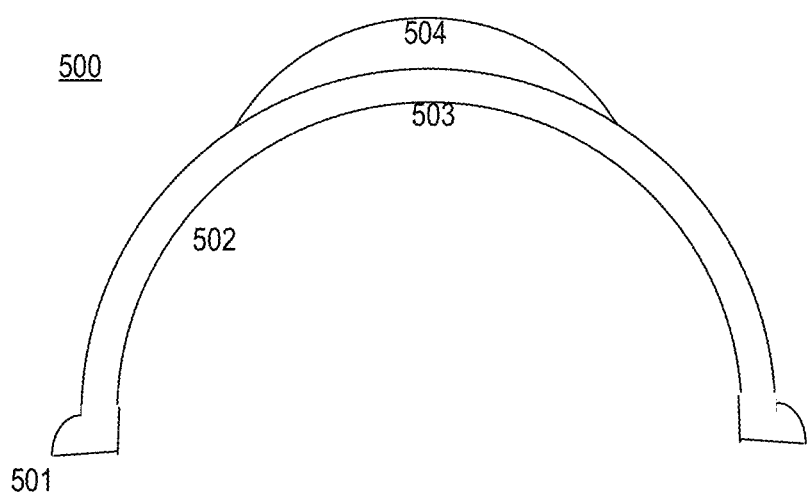
FIG. 5 is a schematic illustration of a profile cutaway view of a lens with a periphery portion and a carrier portion supporting an optic zone, according to some embodiments of the present invention.

Referring now to FIG. 5, a profile cutaway view with a periphery portion 501 and a carrier portion 502 supporting an optic zone 503 and an optic insert or cap 504. In some embodiments of the present invention, the periphery portion 501 may include a higher mass than a carrier portion 502 and/or optic zone 503 portion of the lens 500.

Axial Thickness Profile Generation

The hydrated contact lens front surface radius of curvature ($R_F$) is generated from the thick lens formula using the in-air lens power (P), lens index of refraction (n), center thickness (CT), and back surface radius of curvature ($R_B$).

The thick lens formula may include, by way of non-limiting example:

The effective focal length for a thick lens with respect to the principal planes is given by $$\frac{1}{f} = (n-1)\left[\frac{1}{R_1} - \frac{1}{R_2} + \frac{(n-1)d}{nR_1R_2}\right]$$

and the distances from the lens vertices to the principal planes are $$h_1 = -\frac{f(n-1)d}{R_2 n} \quad h_2 = -\frac{f(n-1)d}{R_1 n}$$

For an ophthalmic lens, exemplary variables may include:

$$R_1 = R_F(m)$$
$$h_1 = h_F$$
$$R_2 = R_B(m)$$
$$h_2 = h_B$$
$$d = CT(m)$$
$$\frac{1}{f} = P$$
$$R_F : R_F = \frac{(n-1)(nR_B + (n-1)CT)}{nR_B P + n(n-1)}$$

Front and back optic zone surfaces may be generated from front and back radii of curvature and center thickness of the ophthalmic lens other optical element.

Figure 6:
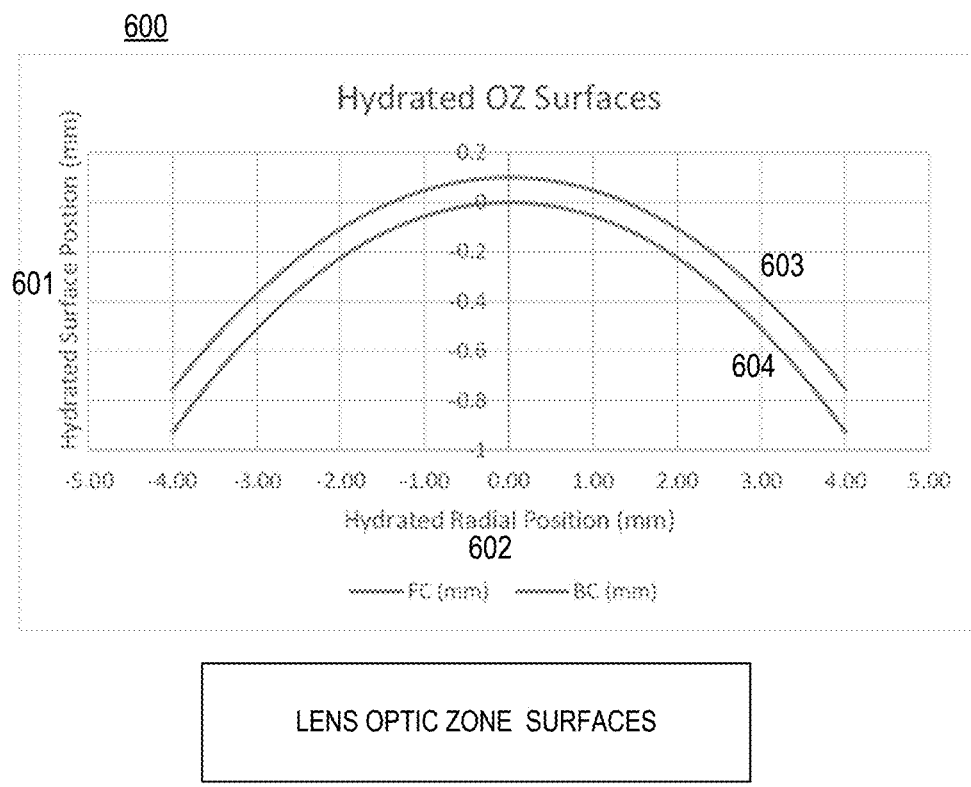
FIG. 6 illustrates a graphical curve representing an exemplary hydrated surface of an ophthalmic lens that is formable according to the present invention.

Exemplary surfaces are shown for a −3.0D design with a 0.1008 mm center thickness, a 9.1 mm back radius of curvature and an index of refraction of 1.4055 are shown in FIG. 6.

In some embodiments, an axial thickness profile may be generated by subtracting a back surface position from a front surface position for multiple radial positions.

A ratio of a hydrated lens to an unhydrated lens may vary based upon the lens material and hydrated lens is 1.4 times larger in each direction than the un-hydrated lens. Therefore, an un-hydrated axial thickness profile may be about 1.4 times smaller than an axial thickness profile generated from the hydrated lens front and back surfaces (as used herein, the term about may be within 10% of a stated amount). Also, radial positions may be about 1.4 times smaller for the un-hydrated lens.

Referring now to FIG. 6, a graphical representation 600 of an optical zone front curve surface 603 and back curve surface 604 of a hydrated ophthalmic lens is illustrated.

The graphical representation 600 includes a first axis with a scale of a hydrated surface position 601 and a second scale with a hydrated radial position 602. A first curve maps values of a front curve 603 and a second curve maps values of a back curve 604 of an ophthalmic lens optic zone.

Figure 7:
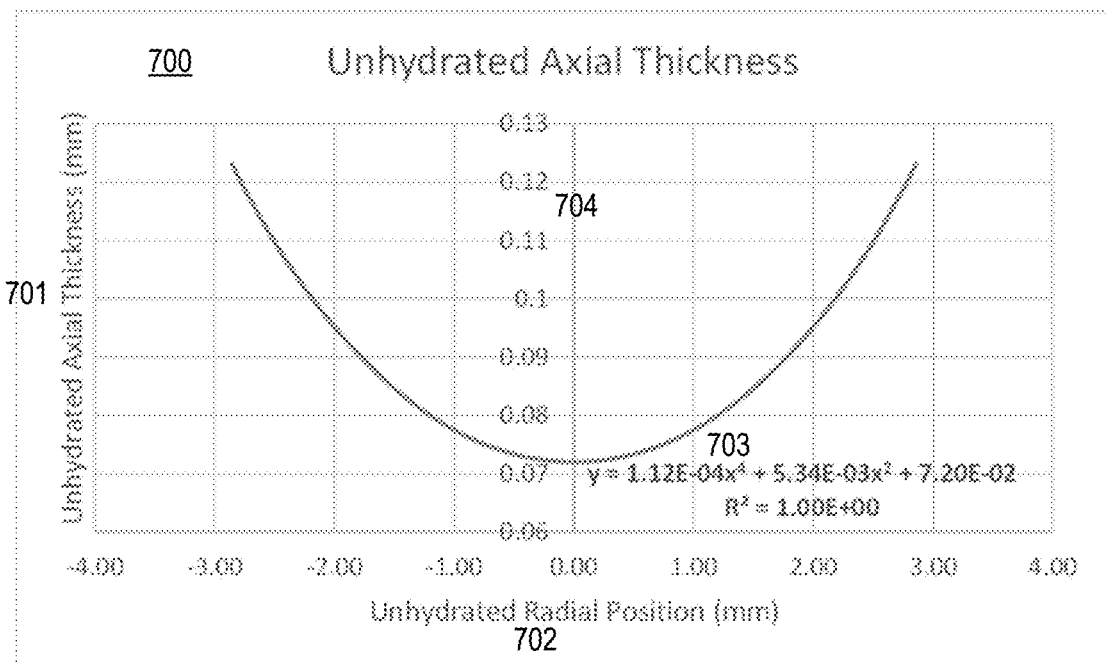
FIG. 7 illustrates a graphical curve representing an exemplary unhydrated axial thickness of an ophthalmic lens that is formable according to the present invention.

Referring now to FIG. 7, a graphical representation 700 of an un-hydrated ophthalmic lens optical zone axial thickness profile 703 is illustrated. In preferred embodiments, an axial thickness profile may be adequately described by an even $4^{th}$ order polynomial. The coefficients from this model may be referenced to generate an optical zone portion of grayscale print pattern, or other energy transmissibility or energy intensity map pattern.

The graphical representation 700 includes a first axis with a scale of an unhydrated axial thickness 701 and a second scale with an unhydrated radial position 702. A curve maps values of axial thickness 703 of an ophthalmic lens optic zone, with numerical values correlating with the thickness 704 displayed in the middle of the graphical representation 700.

For astigmatic lenses, optical power is different for different directions (meridians) in the optical zone. For example, a −2.75D/−4.5DX90 has a power of −2.75D in a vertical direction and −7.5D in a horizontal direction. A resulting axial thickness profile may vary meridian within the optical zone and is 'flattest' in the vertical direction and 'steepest' in the horizontal direction.

Figure 8:
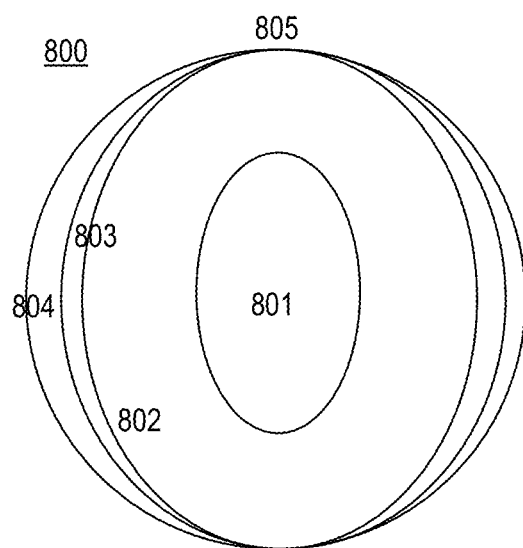
FIG. 8 is a schematic illustration of a false color image of periphery region.

Referring now to FIG. 8, a false color image of a thickness profile 800 is illustrated for an optic zone, where 'a first intensity 801 represents small thickness, and fourth intensity 804 represents an area with a relatively large thickness. One or more intermediate thicknesses 802-803 may also be included, such as a first intermediate thickness 802 and a second intermediate thickness 803. Each thickness may be achieved by depositing an appropriate amount of polymerizable mixture in the respective positions indicated by the thickness profile 800, allowing the polymerizable mixture to settle, pinning the settled polymerizable mixture in place via a gelation process, and finally curing the deposited and pinned polymerizable mixture.

A horizontal (most negative power) and vertical (most positive power) axial thickness profiles may be modeled by even $4^{th}$ order polynomials and the coefficients used to generate an optical zone grayscale print pattern represented by the thickness profile 800.

Energy Transmissibility Print Pattern Generation

In some embodiments, an energy transmissibility print pattern (which may be a grayscale print pattern or other representation of energy intensity) may include two (2) or more regions: an optical zone 801-804 (as illustratively defined by the axial thickness profile); and a periphery 805. Other regions may also be included, such as a region that contains a medicament or other leachable substance. Each region may be defined by various methods. For example, by way of non-limiting example, a pixel size of the print pattern may be specified to be about 0.021 mm. An un-hydrated lens diameter may be, for example, 10.0 mm. A number of pixels in the X & Y directions is defined by the relationship:

$$n_{pixels} = 2 * \text{round}\left(\frac{\text{Diameter}}{2 * \text{pixel size}}\right) + 1$$

This definition ensures that $n_{pixels}$ is odd, so that the center of the lens is at a center of a print pattern.

A number of grayscale levels may also be specified, such as, for example, a print pattern of 8 bits (255 gray levels.) It is within the scope of this invention for both of these values to be changed, which may affect a quality of a printed lens.

Spheres

A spherical lens includes an optical zone that is generally rotationally symmetric (within 10% of symmetry) and may be defined, for example, by using an un-hydrated lens center thickness, and the coefficients from the even $4^{th}$ order model:

thickness (mm)$(x,y)$=CT (mm)+$C_2$(mm$^{-1}$)$r$ (mm)$^2$+
$C_4$ (mm$^{-3}$)$r$ (mm)$^4$, $r$ (mm)=pixelSize (mm)*sqrt$((x-x_0)^2+(y-y_0)^2)$, where $(x_0, y_x)$ is the print pattern center. Other variations are also within the scope of the invention.

A center thickness (CT) used to generate a thickness profile may be based upon a hydrated thickness to the number of layers to be printed times the layer thickness. Thus, if a hydrated lens CT is 0.120 mm, the number of layers to print is 6, and the layer thickness is 0.012 mm, the CT used to generate the print pattern is 0.120 mm−0.72 mm=0.048 mm.

In some preferred embodiments, this may be done to ensure that a ratio of a 'brightest' to 'darkest' pixel in the pattern remains in an acceptable range for printing. In other embodiments, images may be converted by print head controller software to binary images. If a range of grayscales is too large, 'bright' regions may not have enough 'dark' pixels to create a smooth lens surface.

A thickness may be calculated for pixels where r is less than the un-hydrated optical zone semi-diameter ($r_{max}$), typically 4.0 mm/1.4 (~2.857 mm)

A periphery 805 is the region where r (mm) is outside the optical zone 801-804, but within a lens diameter. Many different methods may be used to define a thickness profile of the periphery. For example, in some preferred embodiments, patterns use a thickness at the edge of the optical zone for all pixels in the periphery. Alternate methods may include one or more of: linearly tapering the thickness from the value at the edge of the optical to a value defined at the 'edge' of the lens; and tapering the thickness from the value at the edge of the optical to a value defined at the 'edge' of the lens using a higher order polynomial, or conic section; adding a 'stiffening' ring to the periphery to improve lens handling; tapering using different methods in different zones of the periphery; and a combination of tapering and a 'stiffening' ring.

Torics (Astigmatic Lenses)

An optical zone may not rotationally symmetric and may be defined using an un-hydrated lens center thickness, the two (2) sets of coefficients from the even $4^{th}$ order models of the most positive and most negative power meridians, and a desired angle in a print pattern of a most positive power meridian.

For example, in some embodiments, print patterns may be generated vis calculating the 'effective' $2^{nd}$ order coefficient for each principle meridian:

$$C_{2,effective}(mm^{-1}) = C_2(mm^{-1}) + 0.5 C_4(mm^{-3}) r_{max}(mm)^4$$

The 'equivalent' $r_2$ coefficient is defined as the average of the two (2) effective coefficients. The astigmatic coefficient is defined as:

$$C_{2,2}(mm^{-1}) = 0.5(C_{2,effective,minus}(mm_{-1}) - C_{2,effective,plus}(mm^{-1})),$$

where $C_{2,effective,plus}$ is the effective second coefficient of the most positive meridian, and $C_{2,effective,minus}$ is the effective second coefficient of the most negative meridian.

For each pixel in the lens print pattern, the distance from the lens center (r(x,y)) and the angle in standard Cartesian coordinates ($\theta$(x,y)) are calculated.

An optical zone thickness may be defined as:

$$\text{thickness (mm)}(x, y) = CT(mm) + \left(C_{2,equivalent}(mm^{-1}) + C_{2,2}(mm^{-1})\cos(\vartheta(x, y) + \varphi)\right) r(mm)(x, y)^2,$$

where $\varphi$ is the angle of the most positive meridian.

A thickness at the edge of the optical zone varies with angle. For toric print patterns, a transition zone may be generated to produce a single thickness value for all angles. The transition zone may be an annulus 0.5 mm wide for the hydrated lens (0.5 mm/1.4 for the un-hydrated lens.) A target thickness for the transition may be equal to a minimum thickness at the optical zone boundary and may essentially be equal to:

$$\text{thickness}_{target}(mm) = CT(mm) + (C_{2,equivalent}(mm^{-1}) + C_{2,2}(mm^{-1})) r_{oz}(mm)^2$$

The thickness for each pixel in the transition region is defined as a linear function of its radial position. The thickness at the optical zone edge is defined for each pixel in the transition region as:

$$\text{thickness}_{OZ\,Edge}(mm)(x, y) = CT(mm) + \left(C_{2,equivalent}(mm^{-1}) + C_{2,2}(mm^{-1})\cos(\vartheta(x, y) + \varphi)\right) r_{OZ\,Edge}(mm)(x, y)^2$$

A slope for each point is defined as:

$$\text{slope}(x, y) = \frac{\text{thickness}_{OZ\,Edge}(mm)(x, y) - \text{thickness}_{target}(mm)}{\text{width}_{transition}(mm)}$$

The intercept for each point is defined as:

$$\text{intercept}(mm)(x,y) = \text{thickness}_{target}(mm) - \text{slope}(x,y) r_{transition\,end}(mm)$$

A thickness for each point in the transition region is:

$$\text{thickness}(mm)(x,y) = \text{intercept}(mm)(x,y) + \text{slope}(x,y) r(mm)(x,y)$$

Figure 9:
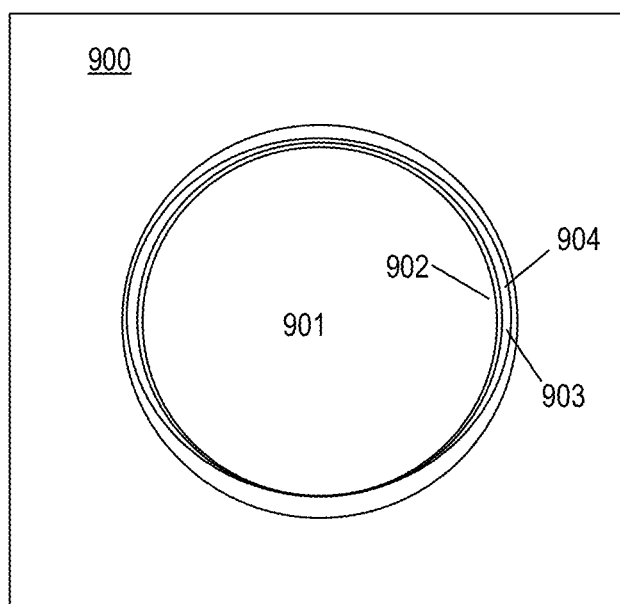
FIG. 9 is a schematic illustration of a false color image of the full lens thickness profile with a transition region zone.

Referring now to FIG. 9, an exemplary graphical image of a transition region is illustrated. A periphery axial thickness profile 900 is defined by a linear change from the end of the transition zone 904 to a minimum axial thickness in the optical zone 901. The slopes and intercepts for the periphery points 902-903 are defined in the same manner as was used to define the transition zone, only using the end of the transition zone and minimum thickness for the edge of the optical zone thickness and the end of the transition zone thickness, respectively. All pixels outside the lens diameter may be set to 0.

Figure 10:
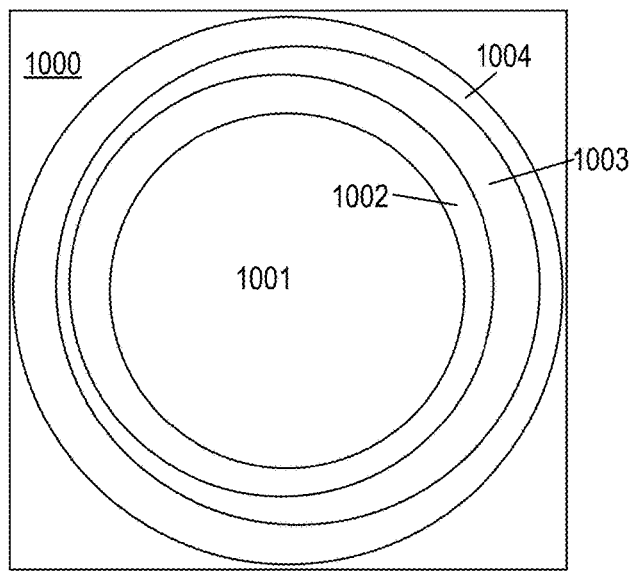
FIG. 10 illustrates a false color image of a thickness profile for a periphery region zone of an astigmatic lens.

FIG. 10 illustrates a thickness profile for a periphery region 1000 of an ophthalmic lens with multiple variant thicknesses 1002-1004 on the periphery region of an optic zone 1001.

Figure 11:
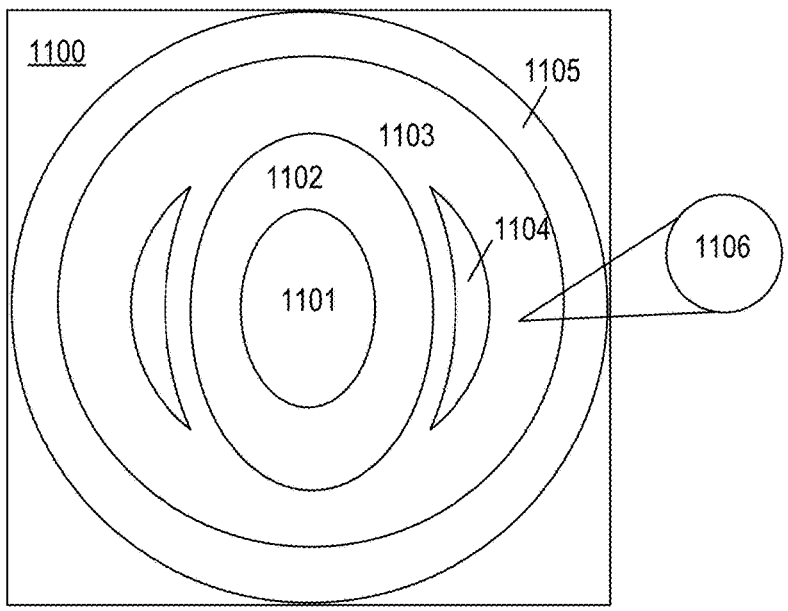
FIG. 11 illustrates a false color image of a thickness profile for an astigmatic lens.

FIG. 11 illustrates a thickness profile of a full ophthalmic lens 1100. The illustrated thickness profile includes lens portions 1101-1105 that comprise an optic zone 1101-1104 and a periphery region 1105. Each of the lens portions 1101-1105 include one or more pixels 1106 (shown in a blown up view). Each pixel 1106 may be associated with a thickness.

Print Pattern

In some embodiments of an energy transmissibility pattern (e.g., and energy intensity pattern or grayscale pattern) that correspond with a print pattern, 'bright' pixels may represent unprinted areas and 'dark' pixels represent areas which receive deposited polymerizable mixture. An 'intensity' of 'dark' pixels corresponds to a desired thickness of a resulting ophthalmic lens at that position.

In some exemplary embodiments, a print pattern 'intensity' of the lens may be defined as:

$$\text{intensity}(x, y) = 255 - \text{floor}\left(\frac{255 * \text{thickness}(mm)(x, y)}{\max(\text{thickness}(mm)(x, y))}\right),$$

where floor( ) converts the value to the smallest integer.

All pixels outside the lens may be set to 255, such that a smaller intensity value corresponds to a larger thickness, and a smallest value corresponds to a smallest thickness.

The value of 255 corresponds to an 8 bit image. If more than 255 gray levels are used, the value of 255 is replaced with the number of gray levels. For example, for a 10 bit image, the value would be 1023.

Figure 12:
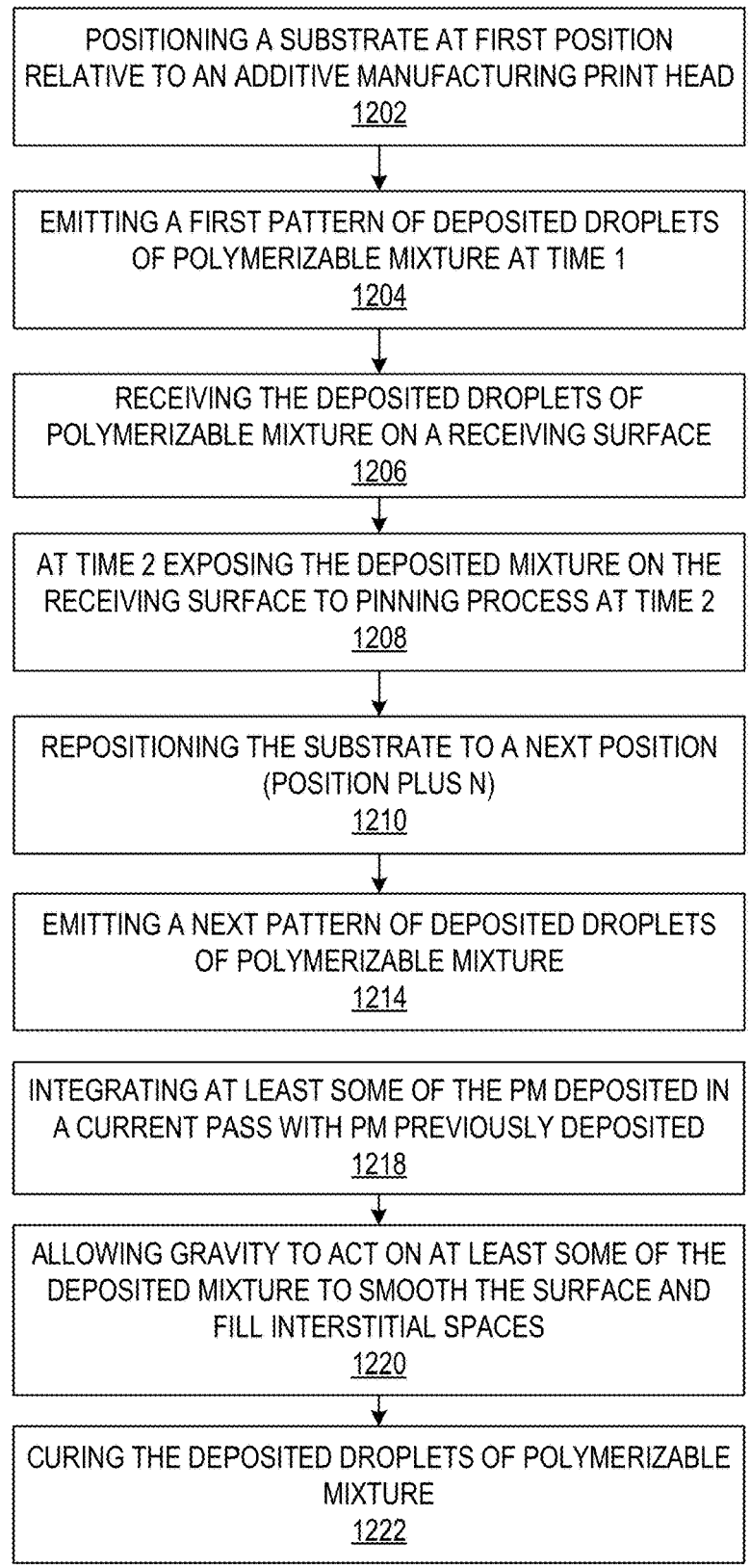
FIG. 12 describes method steps that may be executed while practicing some implementations of the present invention.

Referring now to FIG. 12, method steps for forming an ophthalmic lens, according to some embodiments of the present disclosure, are presented in a flowchart format.

At step 1202, the methods include positioning a substrate at a first position relative to an additive manufacturing print head. The substrate may include a receiving portion that may be planar or arcuate. The receiving portion may act as a receiving surface for a first pass of a print head depositing polymerizable mixture. After a first pass, the receiving surface will typically include at least some areas with previously deposited polymerizable mixture.

At step 1204, the method may include emitting a first pattern of deposited droplets of polymerizable mixture from the print head, the pattern of deposited droplets of polymerizable mixture corresponding with a first portion of an energy transmissibility map of an ophthalmic lens being formed. The pattern is preferably a two dimensional image that represents light intensity through a desired optic. The droplets with emitted at a time designation, such as T1, which may be relative to other time designations. In preferred embodiments, the two dimensional representation will have a numerical value associated with an X,Y position (or other coordinate designation). The numerical value will represent an amount of light that passes through an optical element at a position specified by an X,Y axis designation. A print pattern may be based upon the numerical value, such that, in some embodiments, an amount of polymerizable mixture deposited at a position on a receiving surface corresponding the X,Y pattern correlates with the numerical value (e.g., lighter areas will have a lower X,Y numerical value and will receive less polymerizable mixture, and darker areas will have a higher X,Y numerical value and will receive more polymerizable mixture).

Design of an optical element may be accomplished via analysis of a ray trace pattern of how light passes through the optical element. In some embodiments, an X,Y numerical value in turn may be derived from a mathematical model of a desired optical element three dimensional shape.

At step 1206, the method may include receiving the deposited droplets of polymerizable mixture onto a receiving surface, the receiving surface may include one or more of: the substrate; an aggregation of polymerizable mixture formed from previously emitted droplets of polymerizable mixture; and an insert. The insert may include, for example, an optical insert, a passive electronic device, an active electronic device; and/or a power source, such as a battery, harvesting device, or antenna.

At step 1208, at a second time (T2) deposited droplets of polymerizable mixture on the receiving surface may be exposed to a pinning process. The pinning process will cause partial polymerization of the deposited droplets of polymerizable mixture. Preferably the partial polymerization results in a viscous aggregation of partially polymerized mixture that is resistant to flow but may integrate with subsequently deposited polymerizable mixture.

At step 1210, the method may include repositioning the substrate (and deposited polymerizable mixture) to a next position (position plus N) relative to the print head.

At step 1212, the method may include emitting a next pattern of deposited droplets of polymerizable mixture corresponding with a next portion of the energy transmissibility map of an item being formed, such as an ophthalmic lens being formed.

In various implementations of the present invention, the method may include repeating steps multiple times. For example, there may be multiple passes of the print head relative to the substrate, and multiple dwell times allowing gravity to act on at least some of the deposited droplets of polymerizable mixture to smooth a surface of the deposited polymerizable mixture and fill interstitial spaces between the deposited droplets and aggregating of deposited material with material already deposited and pinned. Accordingly, at step 1214 a next pattern of droplets of polymerizable material may be emitted. The pattern may be a same pattern as a previous pattern or a different pattern.

At step 1218, polymerizable material deposited in a current pass of a print head may be integrated with material on the receiving surface, such as material previously deposited. In some embodiments, the integrated material may form a single volume of polymerizable mixture on the substrate.

At step 1220, gravity may be allowed to act on at least some of the deposited droplets of polymerizable mixture to smooth a surface of the deposited polymerizable mixture and fill interstitial spaces between the deposited droplets and aggregating of deposited material with material already deposited and pinned.

At step 1222, the method may include curing the deposited droplets of polymerizable mixture.

In some embodiments, a pinning process may include exposing the deposited droplets of polymerizable mixture to a first wavelength of actinic radiation for a limited amount of time sufficient to case gelation of the deposited droplets of polymerizable mixture and not cause curing of the deposited droplets of polymerizable mixture. Similarly, in some embodiments, a cure process may include exposing deposited polymerizable mixture to a second wavelength of actinic radiation for a sufficient time and of sufficient intensity to cause polymerization of the deposited droplets of polymerizable mixture. Some embodiments may also include facilitating a cure process by an increase in ambient temperature.

Figure 13:
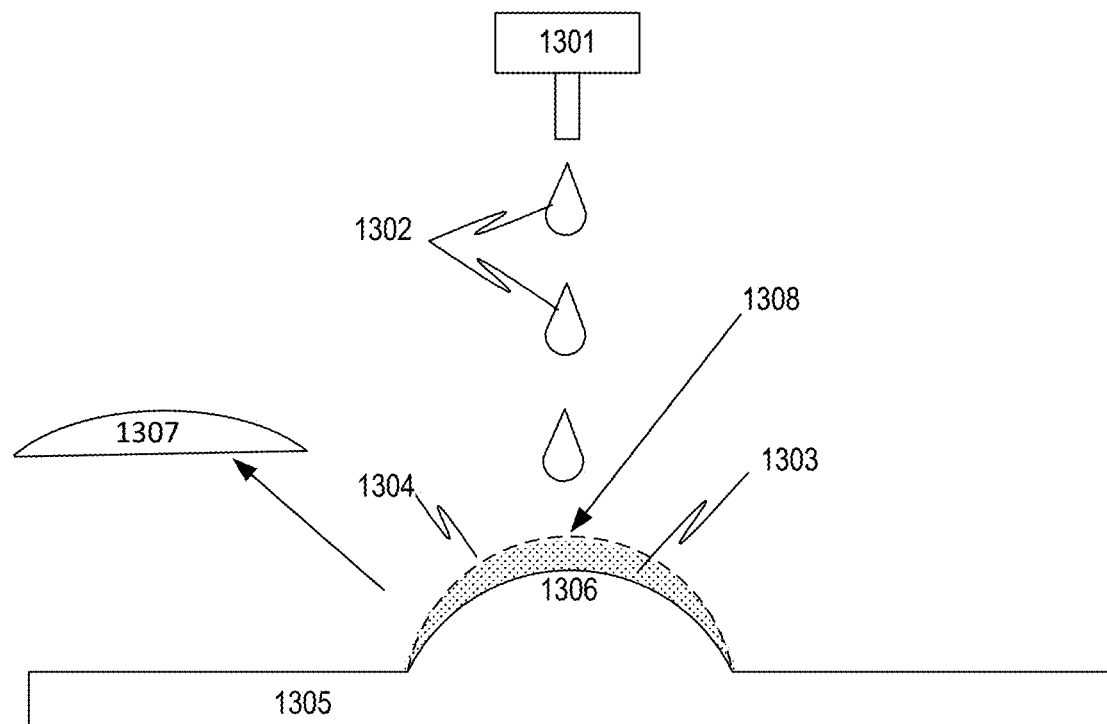
FIGS. 13 and 13A are schematic illustrations of deposited droplets of polymerizable mixture integrating into a volume of polymerizable mixture previously deposited on a substrate.

Referring now to FIG. 13, a schematic diagram illustrates deposition of one or more polymerizable mixtures 1302 from one or more print head(s) 1301 to form an ophthalmic lens 1307. The print head 1301 deposits polymerizable mixture 1302 until a volume of polymerizable mixture 1303 is formed on a receiving area 1306 of the substrate 1305 in a pattern that replicates a 2D pattern used to generate control commands for each pass of the print head 1301 in relation to a position of the substrate 1305. At least some of the receiving area 1306 of the substrate 1305 will act as a receiving surface of the deposited polymerizable mixture 1302 until a volume of deposited polymerizable mixture 1303 covers a footprint area for a design of the ophthalmic lens 1307.

As stated herein, in some preferred embodiments relating to optical elements, amounts of polymerizable mixtures 1302 deposited from a print head 1301 to form an ophthalmic lens 1307, vary in accordance with a two-dimensional pattern that represents an integer map of energy intensity (which may represent transmissibility of energy through the ophthalmic lens).

The pattern is preferably a two dimensional image that represents light intensity through a desired ophthalmic lens 1307. In preferred embodiments, the two dimensional representation will have a respective numerical value associated with multiple X,Y positions. The numerical value may represent an amount of light that passes through the ophthalmic lens 1307 at a given position specified by an X,Y axis designation.

Control commands to the print head cause the print head 1301 to deposit polymerizable mixture 1302 based upon a two dimensional print pattern specifying an amount of polymerizable mixture 1302 deposited at a given X,Y position. After multiple successive passes of depositing the polymerizable mixture 1302, a volume of polymerizable mixture 1303 on the substrate 1305 possesses a three dimensional shape representative of the mathematical model of the desired ophthalmic lens.

The two dimensional print pattern of an amount of polymerizable mixture that represents an amount of light that passes through the ophthalmic lens 1307 at a given position specified by an X,Y axis designation may also correlate with an amount of polymerizable mixture 1302 deposited at a position on the receiving surface 1304 (e.g., lighter areas of the two dimensional print pattern will have a lower X,Y numerical value and will receive less polymerizable mixture, and darker areas will have a higher X,Y numerical value and will receive more polymerizable mixture).

In some embodiments, a design of an ophthalmic lens may be accomplished via analysis of a ray trace pattern of how light passes through the ophthalmic lens. Preferably, an X,Y numerical value in turn may be derived from a mathematical model of a three dimensional shape of a desired ophthalmic lens.

According to the present invention, the two dimensional print pattern specifying an amount of polymerizable mixture deposited at a given X,Y position is printed multiple times in successive passes of the print head relative to the substrate 1305. Deposited polymerizable mixture 1302 is received onto a receiving surface 1304. The receiving surface 1304 may include one or both of: a volume of previously deposited polymerizable mixture 1303, and a receiving area 1306 of the substrate 1305.

Deposited polymerizable mixture 1303 undergoes a pinning and/or gelation process to form a volume of gelled polymerizable mixture 1303. The volume of gelled polymerizable mixture 1303 is polymerized sufficiently to prevent (or at least substantially slow a movement of) the polymerizable mixture that has been received onto the receiving surface while allowing subsequently deposited polymerizable mixture 1302 to meld with previously deposited (and pinned) volume of polymerizable mixture 1303 and form a structure with a single mass of polymerizable mixture. In preferred embodiments, melding may include intermingling with, or becoming interspersed with, the volume of previously deposited and pinned polymerizable mixture 1303 such that individual layers or striations of deposited polymerizable mixture 1302 are not discernable in a volume of polymerizable mixture 1303 formed on a receiving area 1306 of the substrate 1305 once the volume of polymerizable mixture 1303 is cured. Such embodiments may be preferred since unwanted diffraction may be an optical quality resulting from successive steps or other interlayer artifacts associated with disparate layers of polymerized material being present in an ophthalmic lens.

Prior to pinning, gravity may act on a surface 1304 of the volume of polymerizable mixture 1303 to smooth the surface 1304 and fill interstitial aberrations in the surface and thereby improve optical qualities of a resulting ophthalmic device (as compared to a surface of a machined lens and/or a lens formed from a machined mold part).

Curing of the volume of polymerizable mixture 1303 follows disposition of droplets polymerizable mixture 1302 during a final pass of the printhead 1301 and the substrate 1305. Curing may be processed by exposure of the volume of polymerizable mixture 1303 to actinic radiation and/or heat sufficient to cause a substantially complete polymerization of the volume of polymerizable material 1303.

As illustrated, FIG. 13 shows a printhead 1301 that is essentially perpendicular to an apex 1308 of deposited polymerizable mixture 1303. In various embodiments, droplets polymerizable mixture 1302 may (or may not) follow a trajectory that is perpendicular to the apex 1308 of a receiving surface, which may include one or more of the substrate, 1305, a receiving area 1306 and a surface of the previously deposited polymerizable mixture 1303.

Figure 13A:
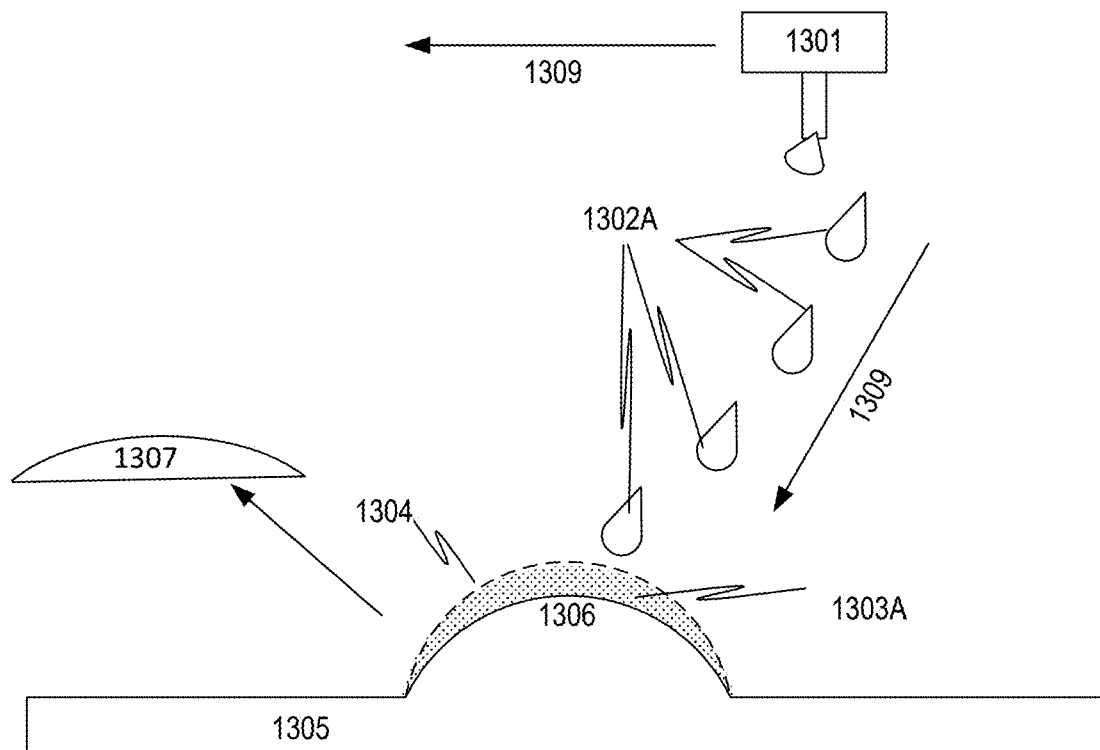

Referring now to FIG. 13A, a printhead 1301 illustrated moving in a direction 1309 of a printing path. Droplets of polymerizable mixture 1302A will follow a droplet trajectory 1309 influenced by the speed and direction of the printhead 1301 at a time of release of the droplets of polymerizable mixture 1302A. The droplet trajectory 1309 will have a speed and direction of its own. According to the present invention, in some embodiments, a printhead 1301 and a droplet trajectory 1309 may be at an angle other than a right angle to the surface of the apex of a receiving surface 1304 for some (e.g., a majority) of the droplets of polymerizable mixture 1302A will integrate into the previously deposited polymerizable mixture 1303A and be pinned and ultimately cured. In this manner, the present process differs over previously known processes that require a small portion of additive manufacture material to be placed on a surface in an incremental manner and not become integrated into previously deposited material before being cured.

Figure 14:
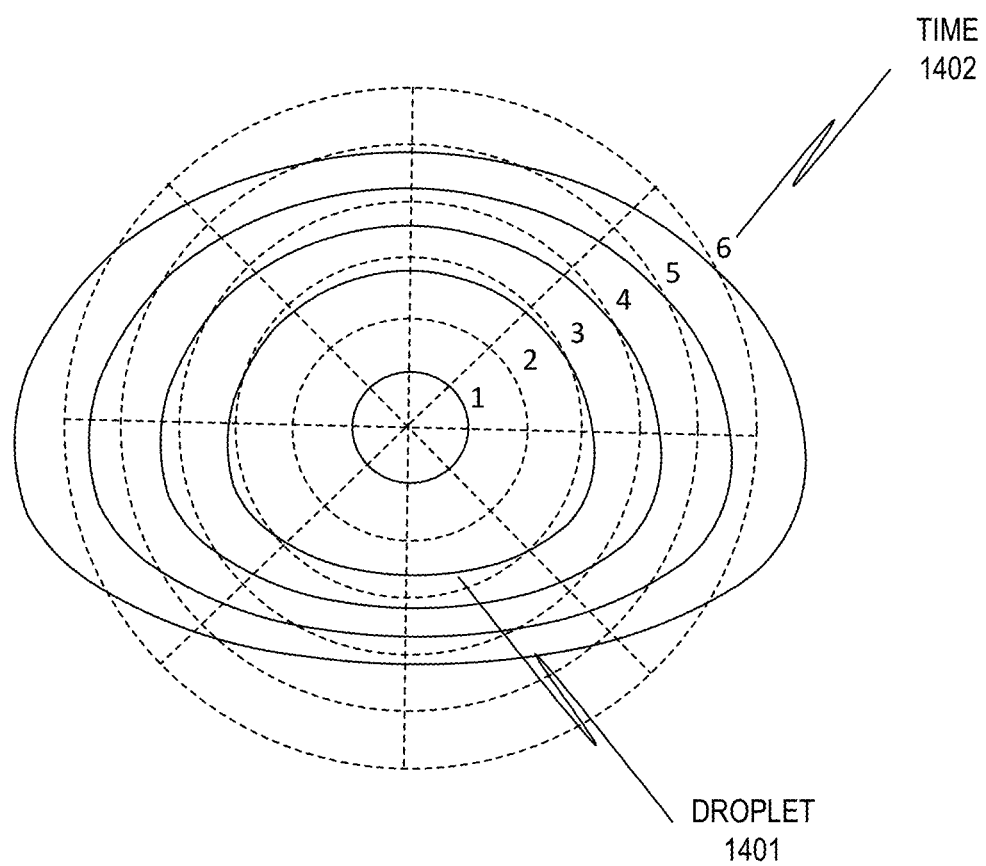
FIG. 14 is a schematic illustration of an exemplary change in shape of a droplet of polymerizable mixture after release from a print head.

Referring now to FIG. 14, an exemplary dynamic shape of a droplet of polymerizable mixture 1401 is illustrated at various times 1402 after release from a printhead. According to the present invention, the shape of the droplet 1401 may vary based upon a speed of travel of the droplet 1401 through an ambient atmosphere. In some preferred embodiments, an article formed by the processes disclosed herein are generally not influenced by a shape of the droplet of polymerizable material 1401. The relatively small mass of each droplet 1401 and the integration of droplet into other polymerizable material on a receiving surface essentially make a shape of a manufactured article unaffected by a shape of individual droplets 1401, or a changing shape of the droplet 1401 at various times 1402 after release by the print head (not shown in FIG. 14).

Referring now to FIG. 15 a flowchart 1500 illustrates exemplary method steps that may be executed in some implementations of the present invention.

At step 1501 the process may include positioning a substrate at first position relative to an additive manufacturing print head.

At step 1502 the process may include emitting a first pattern of deposited droplets of polymerizable mixture from a print head, the first pattern of deposited droplets of polymerizable mixture corresponding with a first portion of a grayscale image.

At step 1503, the process may include receiving the deposited droplets of polymerizable mixture on a receiving surface, the receiving surface may include one or more of: the substrate; previously emitted droplets of polymerizable mixture; and an inserted article. The inserted article may include, by way of non-limiting example, one or more of: an optical element, such as a rigid permeable lens, an electronic device, and a power source.

At step 1504, the process may include repositioning the substrate to a next position relative to the print head. Repositioning may include moving one or both of the substrate and the print head relative to the other.

At step 1505, the process may include emitting a next pattern of deposited droplets of polymerizable mixture from the print head corresponding with a next portion of the grayscale image.

At step 1506, the process may include allowing physical forces, such as gravity, to act on the deposited droplets of polymerizable mixture.

At step 1507, the process may include integrating at least some of the droplets to form a combined volume of polymerizable mixture on the substrate.

At step 1508, the process may include exposing the deposited droplets of polymerizable mixture on the receiving surface to a pinning process causing partial polymerization of the deposited droplets of polymerizable mixture.

At step 1509, the process may include repeating positioning and deposition steps for multiple passes of the print head relative to the substrate.

At step 1510, the process may include curing the combined volume of polymerizable mixture to form an ophthalmic lens.

The process may include, following each pass of the print head relative to the substrate, integrating at least some of the droplets of polymerizable mixture deposited during a current pass with polymerizable mixture previously deposited onto the receiving surface to form a combined volume of polymerizable mixture on the substrate.

At step 1511, the process may include releasing a formed ophthalmic lens from the substrate.

EXPERIMENTAL DETAILS

Method for Determining Water Content of Hydrogel Devices

The water content for hydrogel devices (e.g., contact lenses) may be determined as described in: ISO/DIS 18369-4:2016 in Section 4.6 (Gravimetric Method given in 4.6.2).

Keratometry Measurements

A keratometer measures the central radii of the cornea and in this case the central radii of the front of the non-hydrated hydrogel parts formed on PMMA domes. (see experimental section on 3-D printing on PMMA domes). The instrumentation used was the auto-keratometer from Nidek model ARK900S. The support was set on a horizontal platform and wedges added to align the center and the axis of the PMMA dome bearing the hydrogel surface with the center and axis of the keratometer. In the first set of measurements made which had a large amount of astigmatism the wedges were not used, and the astigmatism measured was an artifact due to the measurements being made off axis.

Radii of Curvature Measurements

Contact lens power depends upon the combination of the powers of the front and back surfaces of the contact lens modulated by the refractive index of the material and contact lens thickness. The powers of the front and back surfaces of the contact lens depend upon the radii of these surfaces.

The relationship between the power and the radius in air is Power=(Contact lens refractive index−1)/Radius; the power is in diopters and the radius in meters.

For the front surface, the radius is defined in ISO18369-1:2006 (E) (2.1.2.2.5) as the radius of curvature of the front optic zone of a surface with a single refractive element.

The radii of curvature of the front of the PMMA domes were measured with an auto-keratometer also known as ophthalmometer which is one of the methods prescribed in ISO DIS18369-3:2016 (Annex C). The ophthalmometer method measures the reflected image size of a target placed at a known distance in front of a rigid or soft lens surface and the relationship between curvature and magnification of the reflected image is then used to determine the back optic zone radius. Nevertheless, this method was used to measure the front surface radii of the PMMA domes.

Light Transmittance

The luminous transmittance is defined in ISO 18369-1: 2006 (E). The values presented in the table further below for luminous transmittance represent the mean between 380 nm and 780 nm. The method of measurement is detailed in ISO DIS18369-3:2106 (4.8.2).

Apparatus and Materials

To demonstrate the principles of the invention a series of experiments were conducted. The experiments were run using:

Raw Materials
- 2-Hydroxyethyl methacrylate (HEMA); 99.9% HEMA with 16 ppm MEHQ;
- Ethyleneglycol dimethacrylate (EGDMA); Assay: 98.0%;
- Methacrylic acid (MAA); Assay: 99.0%;
- Trimethylolpropane trimethacrylate (TMPTMA), Technical Grade;
- Irgacure 651 photo-initiator from BASF Corp, Southfield, Mi;
- Irgacure 819 photo-initiator from BASF Corp, Southfield, Mi;
- Glass microscope slides from EMS, Hatfield, Pa. and from Am Scope;
- Tween 80 (polysorbate 80) surfactant;
- Reagent grade isopropanol;
- Deionized or distilled water;
- Sterile Saline Solution from Walgreens or B&L;
- Nitrogen gas cylinders (<0.1% oxygen) and/or liquid nitrogen tanks;
- Rotovap, glove bags, desiccators, brown bottles, syringes, 5 μm filters, lint-free towels, standard beakers, weighing scale (0.001 g accuracy), vacuum pump;
- LED Sources and Measuring Instruments;
- OMNI lamps with output at 365 nm and 400 nm;
- Omnicure LM 2011 Light meter to measure intensity; and
- Honeywell Toxi Pro 544590VD simple gas Oxygen monitor.
- Gauge that reads below 33 millibars of oxygen.

3D Printing Station

Custom built with a) Fujifilm's Samba printing head and b) a conveyor belt to move substrate under print heads, then two different sources of actinic radiation in the form of UV lamps. The entire printing station is contained in an atmospheric enclosure with gas ports.

Example Series A—Preparation of Model Samples

In this series, square samples (10 mm by 10 mm) of uniform thickness of polymerized HEMA were prepared and evaluated.

Preparation of Substrate

Three drops of Tween 80 were added to 20 ml reagent grade isopropanol and filtered through a 3.1 μm filter. The glass slides were dipped in this solution three times and air-dried.

Preparation of Hydrating Solution

Mixed 5 drops of Tween 80 in 100 mL of deionized water and heated to 80-90° C.

Preparation of Polymerizable Mixtures

PM-1A, PM-1B and PM-1C:
HEMA: 97.7%
EGDMA: 1.6%
Irgacure 819: 0.2%
Irgacure 651: 0.5%
PM-2:
HEMA: 98.1%
EGDMA: 1.2%
Irgacure 819: 0.2%
Irgacure 651: 0.5%
PM-3A, PM-3B AND PM-3C Uncatalyzed polymerization mixture samples (PM-1A, PM-1B, PM-1C, PM-2, PM-3A, PM-3B and PM-3C; see above) were prepared by mixing the monomers and cross-linkers in brown bottles and left in the refrigerator overnight. The final polymerization mixture samples, along with the photo initiators, were processed in a Rotovap using alternate cycles of degassing and nitrogen blanketing. The samples weighed approximately 120 grams for each of PM-1A, PM-1B, PM-1C and PM-2. The same quantity for each of PM-3A, PM-3B and PM3C was approximately 34.5 grams.

The resulting partial pressures corresponding to oxygen concentrations in the polymer mixture are as per below:

PM-1A: <0.5% O2
PM-1B: 2.0% O2
PM-1C: 5.0% O2
PM-2: <0.5% O2
PM-3A: <0.5% O2
PM-3B: 2.0% O2
PM-3C: 8.5% O2

O2 Concentration of <0.5% O2:

A 120 g sample was processed per the following protocol via a Rotovap by alternating 3-4 cycles of degassing to 11.0-12.0 torr (approx. 14.0 mbar) and blanketing with Nitrogen at 760 torr. One degassing cycle ranged from 5-20 minutes and one blanketing cycle did not exceed 5 mins.

O2 Concentration of 2.0% O2:

A 120 g sample was processed to 2.0% O2 per the following protocol via a Rotovap by degassing to 72 torr (95 mbar) and blanketing with Nitrogen at 760 torr. The degassing cycle was 49 mins, and the blanketing cycle did not exceed 15 minutes.

O2 Concentration of 5.0% O2:

A 120 g sample was processed to 5.0% O2 per the following protocol via a Rotovap by degassing to 179 torr (235 mbar) and kept mixing for 45 min followed by blanketing with $N_2$ to 760 torr for a period not exceeding 5 minutes.

O2 Concentration of 8.0% O2:

A 120 g sample was processed to 8.5% O2 per the following protocol via a Rotovap by degassing to 300 torr (400 mbar) and kept mixing for 45 min followed by blanketing with $N_2$ to 760 torr for a period not exceeding 15 minutes.

Settings of LED Sources and Printing Station

Omni lamp at 400 nm was set at 22.0 mms from substrate and intensity set at 4.5 W/cm2 as measured by the light meter in the substrate position.

Omni lamp at 365 nm was set at 123 mms from substrate and intensity set at 0.63 W/cm2 as measured by the light meter. Belt speed for moving substrate from the printing station to the UV station was set at 40 ft/min.

A 10 mm by 10 mm square design of the polymerizable mixture was printed. UV pinning or gelation (stringy/tacky to touch) occurred after 30 sec. (3 cycles of 10 sec.) of exposure to the 400 nm lamp. Measured thickness of the layer was about 24 μm. Several experiments were previously conducted at different intensity settings and exposure times to select the condition.

3D Printing Conditions:

For UV pinning, at 2400 dpi, printing a layer and exposing to the 400 nm lamp for 30 sec. was done 6 times. Following this, the pinned or gelled sample was exposed for 120 sec. under the 365 nm lamp to cure the sample.

Oxygen concentration was measured by two oxygen probes, one mounted near the printing station and another located near the UV station. Control of oxygen was achieved by controlling a flow of separate streams of air and nitrogen that were mixed prior to entry into the processing enclosure.

Results

Cross-sections were made from hydrated samples printed on the glass microscope slides by cutting through the middle of the sample with two stacked surgical blades number 23. The 400 micron wide cut was then placed on the side in a petri-dish with 0.9% saline solution, allowed to equilibrate for an hour and the shape was monitored with a microscope.

Non-uniformity or stresses can then be seen as deviation from the intended shape, which in this case is flat.

Non-uniformity or stresses will adversely affect the optical properties of the material.

The appearance and tackiness of the non-hydrated sample (after curing at 365 nm) were evaluated by visual inspection and by touch, respectively.

The light transmittance value for the hydrated hydrogel sample (10 mm×10 mm) prepared as described above as well as that of a commercial ACUVUE 2 contact lens as a reference (transmittance of 96.83%) was calculated as the mean between 380 nm and 780 nm. See the table below.

The center thickness of the hydrated samples was measured optically with the microscope on cross-sections.

Referring now to FIG. 16A exemplary evaluation data descriptive of hydrated hydrogel samples is illustrated based upon polymerizable mixture PM-1A.

Referring now to FIG. 16B exemplary evaluation data descriptive of hydrated hydrogel samples is illustrated based upon polymerizable mixture PM-1B.

Referring now to FIG. 16C exemplary evaluation data descriptive of hydrated hydrogel samples is illustrated based upon polymerizable mixture PM-1C.

Referring now to FIG. 16D exemplary evaluation data descriptive of hydrated hydrogel samples is illustrated based upon polymerizable mixture PM-2.

The oxygen level in the processing atmosphere impacts the formed article. The light transmittance of the hydrated samples, which is important for the optical function, is quite high at the low levels of oxygen in the processing atmosphere (0.1%, 0.5% and 1.0%) and comparable to a commercially available contact lens. At 2.0% oxygen in the processing atmosphere, there is a decrease in light transmittance and at 5.0% oxygen, a considerable decrease in light transmittance results. Similarly, cross-sections of the hydrated samples show that the lowest level of deformation is obtained with the low levels of oxygen in the processing atmosphere.

The oxygen level in the polymerizable mixture has some effect on the light transmission, but up to 5.0% oxygen can be acceptable if oxygen in the processing atmosphere is low. The cross-sections of the hydrated samples show the lowest level of deformation at 2.0% and 5.0% oxygen in the polymerizable mixture in combination with the low level of oxygen in the processing atmosphere.

A low level of deformation as seen on the cross-sectioned samples indicates that the product is uniform and suitable for optical applications.

For samples made with polymerization mixtures PM-3A, PM-3B and PM-3C, observations were made based on touch after 6 layers were printed and pinned without curing.

The oxygen concentration in the atmosphere was maintained at <0.5 volume-% and was measured by an oxygen probe mounted close to both printing and pinning stations. Control of the oxygen concentration was achieved by a flowmeter connected to a nitrogen tank.

Results

PM-3A having <0.5% Oxygen: Slightly tacky but not stringy.

PM-3B having 2.0% Oxygen: Slightly tacky but not stringy.

PM-3C having 8.5% Oxygen: Tacky and stringy.

Example Series B—Preparation of Hydrogel Surfaces on PMMA Domes

In this series, dome shaped samples of varying thickness of polymerized HEMA were prepared and evaluated.

Preparation of Polymerizable Mixture

HEMA: 97.9-98.1%
EGDMA: 1.2-1.4%
Irgacure 651: 0.5%
Irgacure 819: 0.2%

The polymerizable mixture was prepared as described in a previous experiment that corresponded to an oxygen equilibrium concentration of <0.5 volume-% such as in preparation of PM-1A and PM-2.

3D Printing Conditions:

PMMA (poly(methyl methacrylate)) domes after Tween 80 treatment, were degassed overnight, labeled D and E, and then used as the substrates. Six layers were deposited in diameters ranging from 4 mm to 11 mm with UV pinning at 400 nm for 15 secs after printing each layer and a final cure was done for 120 secs at 365 nm.

Results

The measurements of the two PMMA domes on which the hydrogel surface was printed were made three times and the measurements include three values: flattest radius of curvature, steepest radius of curvature and principal axis.

PMMA Dome D tilted up & right:
1. 8.09/8.06 @ 180
2. 8.10/7.94 @ 120
3. 8.12/7 0.95 @ 112
Mean: 8.10/7.99

PMMA Dome E tilted up & very slightly left:
1. 8.16/7.97 @ 82
2. 8.16/7.97 @ 97
3. 16/7.96 @ 94
Mean: 8.16/7.97

The results demonstrate the following:
i. Presence of a regular optical surface (this is a required feature of the surface to be able to make measurements with the auto-keratometer);
ii. Highly repeatable measurements of both the flattest and steepest radii: Dome D: Flat range 0.03 mm; Steep range 0.12 mm; Dome E: Flat range 0.00 mm; Steep range 0.01 mm. The axis indicates the principal direction and varies due to setting up the dome in front of the instrument without any specific markings, hence this variation is of no relevance.
iii. Both domes exhibited a small amount of astigmatism. The astigmatism was calculated based upon two assumed refractive indices using the power equation described under Radii of Curvature Measurements.

PMMA Dome D with Hydrogel Surface (n=1.49) Power 1=60.49D; Power 2=61.32D; Astigmatism=0.83D; (n=1.42) Power 1=51.85D; Power 2=52.57D; Astigmatism=0.72 D.

PMMA Dome F with Hydrogel Surface (n=1.49) Power 1=60.05D; Power 2=61.48D; Astigmatism=1.43D; (n=1.42) Power 1=51.47D; Power 2=52.69D; Astigmatism=1.22D.

The front surfaces of the PMMA Domes printed with hydrogel surfaces above correspond to the front surfaces of equivalent front surface toric contact lenses, with Dome D equivalent to a 0.75D toric contact lens and Dome E equivalent to a 1.25D toric contact lens.

Example Series C—Preparation of Embedded Inserts

Preparation of Polymerizable Mixture:

Same as in Example series B. The polymerizable mixture was prepared as described in a previous experiment that corresponded to an oxygen equilibrium concentration of <0.5 volume-% such as in preparation of PM-1A and PM-2.

3D Printing Conditions:

The oxygen concentration in the atmosphere was maintained at <0.5 volume-% and was measured by two oxygen probes, one mounted near the printing station and another located near the UV station. Control of the oxygen concentration was achieved by a flowmeter connected to a nitrogen tank.

Degassed polypropylene spheres treated with Tween 80 were used as substrates. Six layers were deposited in diameters ranging from 4 mm to 11 mm with UV pinning at 400 nm for 15 secs after printing each layer. A blue tinted PMMA insert (6 mm diameter and 50 microns thick) after Tween 80 treatment, was degassed overnight, was placed on the pinned layers and two additional layers were deposited in 11 mm diameter with UV pinning at 400 nm for 15 secs after pinning each layer. A final cure was done for 120 secs at 365 nm.

Result:

The blue tinted PMMA insert can be clearly observed and was found to be totally embedded within the hydrogel device. In addition, this method can be used to manufacture soft contact lenses with rigid inserts to mask astigmatism.

Example Series D—Preparation of Embedded Reservoirs or Depots

Preparation of Polymerizable Mixture:

Same as in preparation of PM-2. The polymerizable mixture was prepared as described in a previous experiment that corresponded to an oxygen equilibrium concentration of <0.5 volume-% such as in preparation of PM-1A and PM-2.

3D Printing Conditions:

The oxygen concentration in the atmosphere was maintained at <0.5 volume-% and was measured by two oxygen probes, one mounted near the printing station and another located near the UV station. Control of the oxygen concentration was achieved by a flowmeter connected to a nitrogen tank.

Tween 80 treated glass hemispheres measuring 13 mm in diameter were used as substrates. 15 layers were deposited with a diameter of 9.5 mms with UV pinning at 400 nm for 15 secs after printing each layer. A small piece of a plastic micropipette packed with food coloring crystals was then placed on the pinned 15 layers. Three additional layers with a diameter of 9.5 mms were deposited with UV pinning at 400 nm for 15 secs after printing each layer. A few additional drops of the polymerizable mixture were deposited to ensure complete encapsulation of the micropipette piece and the assembly was cured for 120 secs at 365 nm.

Result:

The plastic micropipette containing food coloring crystals can be clearly observed and was totally embedded within the hydrogel device. This method demonstrates the embedding of functional additive releasing reservoirs or depots within ophthalmic devices such as contact lenses. Subsequent hydration of the assembly in water showed the hydrating water was tinted and the absence of the food coloring crystals in the micropipette piece.

Example Series E—Preparation of Ophthalmic Devices with Asymmetric Designs

Preparation of Polymerizable Mixture.

Same as in preparation of PM-2. The polymerizable mixture was prepared as described in a previous experiment that corresponded to an oxygen equilibrium concentration of <0.5 volume-% such as in preparation of PM-1A and PM-2.

3D Printing Conditions:

The oxygen concentration in the atmosphere was maintained at <0.5 volume-% and was measured by two oxygen probes, one mounted near the printing station and another located near the UV station. Control of the oxygen concentration was achieved by a flowmeter connected to a nitrogen tank.

Tween 80 treated glass hemispheres measuring 13 mm in diameter were used as substrates. Ten layers with an asymmetrical design (Atheneum Optical Sciences Logo) measuring about 6 mm by 4 mm were deposited on the substrate with UV pinning at 400 nm for 15 secs after printing each layer. Then 17 layers were deposited with UV pinning at 400 nm for 15 secs after printing each layer. The assembly was then cured for 120 secs at 365 nm.

Result:

The asymmetrical design of the logo can be clearly observed within the hydrogel device before and after hydration in saline solution. This method demonstrates the viability of incorporating asymmetric structures to correct asymmetric refractive errors in ophthalmic devices such as contact lenses.

Example Series F—Preparation of Samples with Image Quality Optics and Refractive Corrections Preparation of Polymerizable Mixture:
HEMA: 95.4%
MAA: 2.5%
EGDMA: 1.2%
TMPTMA: 0.1%
Irgacure 819: 0.3%
Irgacure 651: 0.5%

The polymerization mixture was prepared as described in a previous experiment that corresponded to an oxygen equilibrium concentration of <0.5 volume-% similar to the preparation of PM-1A and PM-2.

3D Printing Conditions:

The oxygen concentration in the atmosphere was maintained at <0.5 volume-% and was measured by an oxygen probe mounted close to both printing and pinning stations. Control of the oxygen concentration was achieved by flowmeters connected to a nitrogen tank. The Samba print head resolution was set at 1200 dpi.

10.0 mm diameter circular designs were printed to generate the samples. Belt speed was set at 10.0 feet per minute. UV pinning or gelation occurred after 10 sec exposure to the 400 nm UV lamp. Curing was done for 120 sec by exposure to the 365 nm UV lamp. With printed prescriptions, foundation layers were first printed, pinned, and cured; thereafter each prescription layer was pinned and then cured for 120 secs after which a top or final coat was printed, pinned, and cured. Substrates used for preparing the samples were glass microscope slides treated with Tween 80 as described in Example series A. Power in diopters (D) was measured with a Topcon CL-200 lensometer. Dry power was measured on the printed sample inclusive of the glass slide substrate while the wet power was measured after releasing the sample from the hydrating solution (heated distilled water containing Tween 80 as described earlier) and then equilibrating in saline solution for more than 20 hours. The diameter of the hydrated samples was measured to be 13.9±0.1 mm.

The results are shown in the Table below:

| SAMPLE | TARGET/DESIGN POWER (D) | FOUNDATION LAYERS (NUMBER) | PRESCRIPTION LAYERS (NUMBER) | MEASURED DRY POWER (D) | MEASURED WET POWER (D) |
|---|---|---|---|---|---|
| 1 | — | 5 | — | 0.00 to 0.25 | 0.00 to 0.25 |
| 2 | — | 10 | — | 0.00 to 0.25 | 0.00 to 0.25 |
| 3 | +1.00 | 10 | 3 | 0.75 ± 0.00 | 0.75 ± 0.25 |
| 4 | +3.00 | 10 | 3 | 3.00 ± 0.25 | 2.75 to 3.00 |

Results:

The dry and wet power results shown in the table above indicate that three-dimensional deposition printing can produce optical devices with image quality optics such as ophthalmic lenses to correct refractive errors.

General Remarks

Although the present description and claims occasionally refer to a mixture (such as a polymerizable mixture), an initiator, other additives, it is within the scope of this invention that the materials and compositions defined herein may comprise one, two, or more types of individual constituents. In such embodiments, a total amount of a respective constituent should correspond to an amount defined above for the individual constituent.

The (s) in the expressions: mixture(s), initiator(s), etc. indicates that one, two, or more types of the individual constituents may be present. On the other hand, when the expression one is used, only one (1) of the respective constituent is present.

It should be understood that the expression % means the percentage of the respective component by weight, unless otherwise noted.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, separation of various system components in the embodiments described above should not be understood as requiring such separation in all embodiments, and it should be understood that the described program components and systems can generally be integrated together in a single hardware and/or software product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A method of forming an article via additive manufacturing, the method comprising steps of:
    a. receiving digital data representative of one or both of: a shape of a patient's eye and an appearance of the patient's eye;
    b. referencing the digital data comprising one or more of: a shape of a patient's eye and an appearance of the patient's eye, generating an energy transmissibility map comprising a pattern of values representing transmissibility of energy through the article;
    c. emitting a first print pattern of polymerizable mixture as droplets, the first print pattern of polymerizable mixture corresponding with the energy transmissibility map; and
    d. receiving at least a portion of the first print pattern of polymerizable mixture droplets as a first volume of polymerizable mixture on a receiving surface comprising one or both of: a substrate and previously deposited polymerizable mixture.

2. The method of claim 1, wherein step a. comprises measuring a patient's eye and generating data comprising one or more of: optical characteristics, surface properties, and size and shape dimensions of the patient's eye, and the method additionally comprises the step of: exposing the first volume of polymerizable mixture to a pinning process causing at least partial polymerization of the first volume of polymerizable mixture.

3. The method of claim 2, additionally comprising the steps of: bringing the first volume of polymerizable mixture to gel point via the pinning process; emitting a second print pattern of polymerizable mixture; receiving at least a portion of the second print pattern of polymerizable mixture on the receiving surface as a second volume of polymerizable mixture; integrating the first volume of polymerizable mixture which has previously been brought to a gel point and the second volume of polymerizable mixture to form a combined volume of polymerizable mixture.

4. The method of claim 3, additionally comprising the step of exposing the combined volume of polymerizable mixture to actinic radiation to form a polymer network suitable for optical function.

5. The method of claim 1, wherein the article comprises an ophthalmic device selected from: a spectacle lens, a contact lens, an overlay lens, an intraocular lens, a corneal implant, an ophthalmic insert, an ocular insert; and a lens to correct refractive errors in keratoconus or astigmatic corneas.

6. The method of claim 5, wherein the ophthalmic device has an asymmetrical design.

7. The method of claim 3, wherein the first print pattern and the second print pattern represent a portion of an ophthalmic device for correcting optical aberrations resulting from laser surgery.

8. The method according to claim 1, additionally comprising a step of embedding one or more objects in the first print pattern of polymerizable mixture on the receiving surface, the one or more objects comprising one or more of: an insert, an electronic device, and a functional additive releasing reservoir comprising one or more functionally active substances including biologically active substances.

9. The method according to claim 1, wherein the article comprises a soft contact lens and the method additionally comprises a step of placing a rigid insert suitable to mask astigmatism in the first print pattern of polymerizable mixture.

10. The method of claim 1, wherein the article comprises an ophthalmic device comprising an optic zone, and the method additionally comprises a step of depositing a greater mass of polymerizable mixture in a portion of the ophthalmic device outside the optic zone, and subsequently depositing a lesser mass of polymerizable mixture in the optic zone.

11. The method of claim 1, wherein the step of emitting the first print pattern of polymerizable mixture comprises emitting an amount of polymerizable mixture to be placed at a given location on the receiving surface that corresponds with a data value associated with pixels included in the energy transmissibility map.

12. The method of claim 11, wherein the energy transmissibility map comprises an integer map representative of the entire article.

13. The method of claim 12 wherein the data value corresponds with a darkness level of an area of the integer map representative of the entire article, and the darkness level corresponds with a thickness of an area of the article.

14. The method of claim 12 wherein the data value corresponds with an amount of polymerizable mixture to be placed at a location that corresponds with at least one of: an optical characteristic of a patient's eye; a surface property of the patient's eye; and a size and shape of the patient's eye.

15. The method of claim 1, additionally comprising a step of allowing physical forces to act on the first print pattern of polymerizable mixture on the receiving surface and thereby improve a quality of the article.

16. The method of claim 15 wherein the physical forces comprise surface tension.

17. The method of claim 15 wherein the physical forces comprise microforces.

18. The method of claim 1 wherein the polymerizable mixture comprises a photo initiator associated with a wavelength of actinic radiation to which the polymerizable mixture is exposed during one or both of: a pinning process and a curing process.

19. The method of claim 1 wherein the polymerizable mixture comprises a pigment.

20. The method of claim 1 wherein the substrate comprises at least one of: glass, polyolefin, and polystyrene.

21. The method of claim 1, wherein the first print pattern of polymerizable mixture comprises a spherical optical zone within ten percent of symmetry.

22. The method of claim 1, wherein the first print pattern of polymerizable mixture comprises a non-spherical shape.

23. The method of claim 1, wherein the step of emitting the first print pattern of polymerizable mixture comprises emitting droplets of a first polymerizable mixture by a first print head, and the method additionally comprises a step of: emitting droplets of a material from a second printhead.

24. A method of forming a optical lens, the method comprising the steps of:
a. receiving digital data representative of one or both of: a shape and an appearance of a patient's eye;
b. refencing the digital data representative of one or both of: a shape and an appearance of a patient's eye, generating a model of an ophthalmic device;
c. converting the model of the ophthalmic device into an energy transmissibility map;
d. produce instructions to control a 3D printer to apply polymerizable mixture to a receiving surface according to the energy transmissibility map;
e. repeatedly apply the polymerizable mixture to the receiving surface with the 3D printer according to an energy transmissibility pattern to form a combined volume of polymerizable mixture; and
f. crosslinking a majority of the combined volume of polymerizable mixture.

* * * * *